United States Patent [19]

Richter et al.

[11] Patent Number: 5,664,159
[45] Date of Patent: Sep. 2, 1997

[54] METHOD FOR EMULATING MULTIPLE DEBUG BREAKPOINTS BY PAGE PARTITIONING USING A SINGLE BREAKPOINT REGISTER

[75] Inventors: David E. Richter, Milpitas; James S. Blomgren, San Jose, both of Calif.

[73] Assignee: Exponential Technology, Inc., San Jose, Calif.

[21] Appl. No.: 436,136

[22] Filed: May 8, 1995

Related U.S. Application Data

[63] Continuation-in-part of Ser. No. 207,857, Mar. 8, 1994, Pat. No. 5,440,710.

[51] Int. Cl.$^6$ .................................................. G06F 12/10
[52] U.S. Cl. .................... 395/500; 395/800.41; 711/207
[58] Field of Search .................................. 395/500, 417, 395/375, 800

[56] References Cited

U.S. PATENT DOCUMENTS

| | | | |
|---|---|---|---|
| 4,675,646 | 6/1987 | Lauer | 340/146.2 |
| 5,239,642 | 8/1993 | Guiterrez et al. | 395/425 |
| 5,249,278 | 9/1993 | Krauskopf | 395/400 |
| 5,371,894 | 12/1994 | DiBrino | 395/800 |
| 5,440,710 | 8/1995 | Richter et al. | 395/417 |
| 5,530,822 | 6/1996 | Beavers | 395/417 |
| 5,535,351 | 7/1996 | Peng | 395/417 |
| 5,560,013 | 9/1996 | Scalzi et al. | 395/700 |
| 5,560,035 | 9/1996 | Garg et al. | 395/800 |

*Primary Examiner*—Kevin J. Teska
*Assistant Examiner*—Andrew S. Roberts
*Attorney, Agent, or Firm*—Stuart T. Auvinen

[57] ABSTRACT

A single breakpoint address register on a CPU is shared to emulate a plurality of breakpoint registers. A plurality of breakpoints are stored in an emulation area of main memory. One of these breakpoints is loaded into the single breakpoint register on the CPU. When a translation-lookaside buffer (TLB) on the CPU detects a page miss, a page miss handler activates a debug processing routine to determine if the faulting page contains one of the breakpoints. If the faulting page does contain a breakpoint, then this breakpoint is written to the single breakpoint register on the CPU. Any page in TLB is invalidated if it contained the old breakpoint that was overwritten by the new breakpoint in the single breakpoint register. Thus only one breakpoint can have a page translation in the TLB at any time, and the breakpoints are swapped in and out of single breakpoint register when the TLB entries are swapped. A TLB invalidate entry instruction finds the old breakpoint's TLB entry and invalidates it. When multiple breakpoints exist on a single page, then that page is divided into partial pages, with each partial page having just one breakpoint. The TLB entries contain upper and lower bounds fields to identify the extent of the partial page. A bit in the condition register is set when multiple breakpoints exist on the same page.

18 Claims, 14 Drawing Sheets

11

METHOD FOR EMULATING MULTIPLE DEBUG BREAKPOINTS BY PAGE PARTITIONING USING A SINGLE BREAKPOINT REGISTER

BACKGROUND OF THE INVENTION— RELATED APPLICATIONS

This application is a continuation-in-part (CIP) of "Emulation of Segment Bounds Checking Using Paging with Sub-Page Validity", U.S. Pat. No. 5,440,710, U.S. Ser. No. 08/207,857 filed Mar. 8, 1994, assigned to the same Assignee and with at least one common inventor. This application is also related to "Emulation of Program Watchpoint Checking Using Paging With Sub-Page Validity", U.S. Ser. No. 08/444,813, assigned to the same Assignee and with at least one common inventor. This application is further related to "A Translator having Segment Bounds Encoding For Storage in a TLB", U.S. Ser. No. 08/436,137 , also assigned to the same Assignee and with at least one common inventor.

BACKGROUND OF THE INVENTION—FIELD OF THE INVENTION

This invention relates to computer systems, and more particularly to emulation of breakpoint checking.

BACKGROUND OF THE INVENTION— DESCRIPTION OF THE RELATED ART

Advanced architectures such as RISC (reduced instruction set computers) provide fewer computing resources in hardware than older CISC (complex instruction set computer) architectures. While RISC has the potential of higher operating speeds than CISC, many programs have been written for CISC architectures. Most personal computers (PC's) use the x86 architecture, at present embodied in CPU's such as the 386, 486, and Pentium™ manufactured by Intel Corporation of Santa Clara, Calif., and others.

The parent application discloses a RISC architecture capable of emulating certain aspects of the x86 CISC architecture. In particular, segmentation is emulated by extending the translation-lookaside buffer (TLB) to allow for less than a whole page to be valid.

Like the x86 segmentation, x86-style program watchpoint or breakpoint checking is awkward to implement in a standard RISC processor. RISC processors such as PowerPC™ processors by Motorola provide far fewer hardware resources than x86 processors. While additional breakpoint registers, comparators, and control logic could be added to a RISC processor to support CISC breakpointing, this increases the cost and complexity of the RISC processor.

PRIOR-ART CISC DEBUG HARDWARE—FIG. 1

FIG. 1 is a block diagram of debug breakpoint hardware in a typical x86 processor, which includes paging.

Linear address 18 is translated to physical address 20 by translation-lookaside buffer or TLB 16, which is a small cache of the page translation tables stored in main memory. TLB 16 translates the upper 20 bits of linear address 18 by searching the associative TLB cache for a match, and if one is found, then replacing these upper 20 bits with another 20 bits stored in the TLB 16.

If the linear address is not found in the TLB, then a miss is signaled to a translator (not shown), which accesses the page tables in main memory and loads into the TLB the page table entry that corresponds to the linear address. Future references to the same page will "hit" in the TLB, which will provide the translation.

Four debug registers 10 may each contain a linear address where a breakpoint is to occur. When a program accesses an instruction or data operand at this linear address, then a breakpoint is signaled and the program halted. Comparators 26 compare the current linear address 18 to the breakpoint addresses stored in debug registers 10 and output match indications to AND gates 12.

Debug control register 14 contains bits to enable each of the four debug registers 10, and possibly a global debug enable bit. Register 14 also contains data/code bits to indicate if the breakpoint addresses in each of debug registers 10 are for instruction addresses or data operand addresses. Four bits may be used, one for each debug register 10. Thus some breakpoints may be for instructions while others for data. These data/code bits in register 14 are compared to a data/code signal 21 which indicates if the current linear address 18 is for a data operand or an instruction (code). Comparators 28 compare the D/C signal 21 to each of the four data/code bits in register 14, and output D/C match signals 24 to AND gates 12. If linear address 18 matches one of the breakpoint addresses in registers 10, and the data/code signal 21 matches the data/code bit in register 14, then one of AND gates 12 will output a high signal which will be passed by OR gate 22 to generate a breakpoint signal. Comparators 28 may also check that the debug registers 10 are enabled before generating the match indication.

OBJECTS OF THE INVENTION

While the prior-art debug apparatus is effective, RISC processors may provide only one or two debug registers and comparators, rather than the four used by x86 CISC CPU's. The RISC debug registers are restricted to either instruction or data operands and are thus less flexible than the CISC debug registers. In the PowerPC™ architecture, a single register is provided for data operand breakpointing, while another single register is provided for instruction breakpointing.

What is desired is to emulate multiple breakpoints with a single breakpoint register. When multiple breakpoints are enabled, it is desired to emulate CISC-style breakpointing with a simple RISC-type paging system that allows for partial pages or sub-page validity. Emulation routines are desired to properly handle a page miss when the page contains a breakpoint. Emulation routines are also desired to emulate setup of debug registers.

SUMMARY OF THE INVENTION

In one aspect the invention is a method for emulating a plurality of breakpoints on a processor with a single breakpoint register which stores just one breakpoint address. The processor also has a translation-lookaside buffer (TLB) with a plurality of page entries. The breakpoints are addresses which halt execution of a user program when accessed.

Page entries are freely loaded into the TLB when no more than one breakpoint in the plurality of breakpoints is enabled. When two or more breakpoints in the plurality of breakpoints are enabled, then a page fault is signaled when a faulting page does not have a translation in the TLB. It is determined if a breakpoint in the plurality of breakpoints falls within the faulting page when the page fault is signaled. The breakpoint falling within the faulting page is hereinafter referred to as a first breakpoint. A page entry is loaded into the TLB for the faulting page while the first breakpoint is loaded into the breakpoint register on the processor when the faulting page contains the first breakpoint. Any page entries in the TLB containing a breakpoint are invalidated, other than the faulting page entry. Execution of the user program is halted when the user program accesses an address matching the breakpoint address in the breakpoint register on the processor.

Thus only one breakpoint in the plurality of breakpoints has a page translation entry in the TLB, which is loaded into the breakpoint register on the processor when the faulting page entry is loaded into the TLB.

In other aspects of the invention the plurality of breakpoints are addresses of data operands or instructions. Further aspects include a step to determine when more than one breakpoint in the plurality of breakpoints falls within the faulting page. The faulting page is divided into partial pages when more than one breakpoint falls within the faulting page. Each partial page contains no more than one breakpoint in the plurality of breakpoints. Bounds fields are loaded into the TLB when loading the page entry for the faulting page when the faulting page contains more than one breakpoint. The bounds fields define the boundaries of the partial page within the faulting page. Thus pages may contain multiple breakpoints yet the multiple breakpoints share the single breakpoint register on the processor.

In other aspects a multiple-breakpoint bit in a condition register on the processor is read to determine when multiple breakpoints are enabled. The multiple-breakpoint bit is set when a second breakpoint is enabled in the plurality of breakpoints and the second breakpoint falls within a page which already contains another enabled breakpoint in the plurality of breakpoints.

Other aspects of the invention include a system for emulating processing of a plurality of breakpoints. The breakpoints are addresses which halt execution of a user program when accessed. A central processing unit (CPU) has a breakpoint register that stores a single breakpoint address which halts execution of a user program when encountered. An address compare means receives a linear address generated by execution of the user program and is coupled to the breakpoint register. It compares the linear address to the breakpoint address and signals a breakpoint fault when an address match occurs. A translation-lookaside buffer (TLB) receives the linear address. The TLB has a plurality of page translation entries for pages in memory having a fixed number of offset addresses. Each page translation entry has a linear address field and a physical address field. The TLB outputs the physical address field for a matching entry when a portion of the linear address matches the linear address field in the matching entry. A memory has a plurality of storage locations addressable by a plurality of physical addresses. A first portion of the memory stores a debug table which has a plurality of debug entries each for storing a breakpoint address. A second portion of the memory stores an emulation handler routine which includes a means for copying a breakpoint address from one of the debug entries in the debug table to the breakpoint register on the CPU. An invalidation means invalidates a translation entry in the TLB containing a breakpoint address stored in the debug table but not stored in the breakpoint register on the CPU.

Thus only one breakpoint from the debug table in memory has a page translation entry in the TLB. The one breakpoint is loaded into the breakpoint register on the processor by the emulation handler routine.

In other aspects the CPU has a bound field in the matching entry in the TLB. The bound field contains a bound for a partial page. A bounds checking means receives the bound from the matching entry of the TLB and compares a portion of the linear address to the bound. A page fault is signaled if the linear address is outside the bound for the partial page. The emulation handler means has a partial page loading means for loading the bound field of the matching entry when the page translation entry is for a page containing multiple breakpoints. The page is divided into partial pages each containing one breakpoint.

Another aspect of the invention is a method for emulating a plurality of breakpoints on a processor with no breakpoint register. A translation-lookaside buffer (TLB) on the processor has a plurality of page entries. Pages entries are freely loaded into the TLB when no breakpoint in the plurality of breakpoints is enabled. When one or more breakpoints in the plurality of breakpoints are enabled, then a page fault is signaled when a faulting page does not have a translation in the TLB. If a breakpoint in the plurality of breakpoints falls within the faulting page when the page fault is signaled, then no page entry is loaded into the TLB for the faulting page. A memory access is instead emulated for the faulting page when the faulting page contains the breakpoint. Execution of the user program is halted when the user program accesses an address matching the breakpoint address. Thus no breakpoint in the plurality of breakpoints has a page translation entry in the TLB.

DETAILED DESCRIPTION

The present invention relates to an improvement in program debugging using breakpoints. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

RISC BREAKPOINT HARDWARE—FIG. 2

Figure 2:
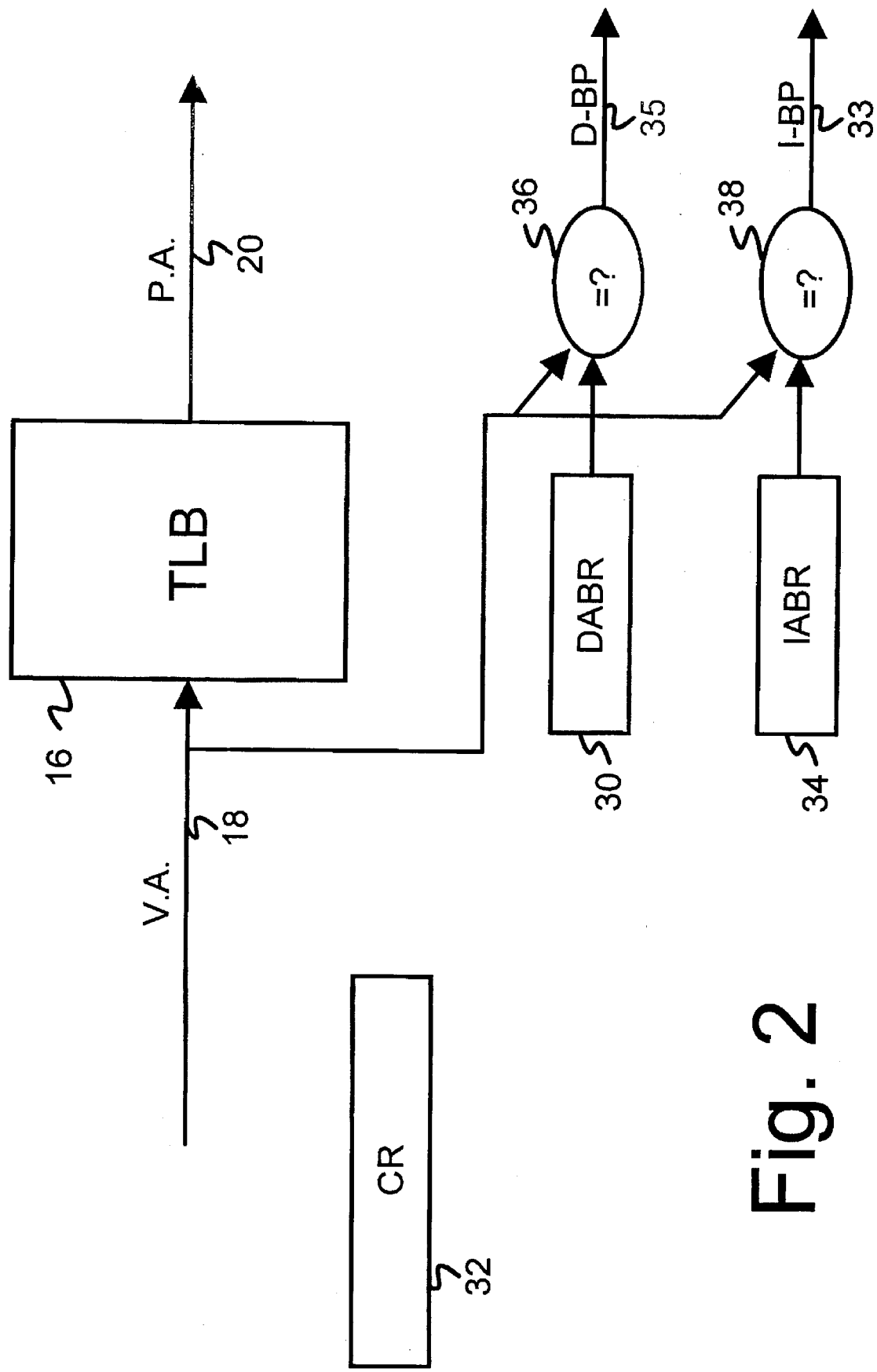
FIG. 2 is the breakpoint apparatus for a RISC processor.

FIG. 2 is the breakpoint apparatus for a RISC processor. Virtual address 18 can be the x86 linear address when the segment base addition is performed before generating virtual address 18. Virtual address 18 is translated to physical address 20 by translation-lookaside buffer (TLB) 16, as is well-known in the art. Condition register 32 contains flags or condition codes that are set by programs and the operating system. In the PowerPC™ RISC architecture, register 32 is known as the CR register. Data-address breakpoint register (DABR) 30 is loaded with a breakpoint address for a data operand, while instruction-address breakpoint register (IABR) 34 is loaded with a virtual address where a breakpoint of an instruction is to occur.

Comparators 36, 38 compare the current virtual address 18 to the data and instruction breakpoint addresses stored in registers 30, 34 and generate data breakpoint signal 35 or instruction breakpoint signal 33 if an address match occurs. A breakpoint control register (not shown) may also be used to mask off some of the bits compared, allowing for the breakpoint to occur over a range of addresses.

RISC provides only one breakpoint register for instructions, and another breakpoint register that can only be used for data operands. The present invention includes methods to use either one of these registers to emulate up to four x86-style breakpoint registers. Since these are 32-bit breakpoint registers, significant hardware is saved.

TLB WITH SUB-PAGE FIELDS—BACKGROUND

Several embodiments of a RISC-type paging system adapted for emulation of segment bounds checking are presented in the parent, U.S. Pat. No. 5,440,710. A TLB was disclosed which is capable of having less than a full page valid. While the predominant use of sub-page validity is for emulation of segmentation, sub-page validity may also be used for emulation of breakpointing. When combined with RISC's single breakpoint registers, sub-page validity can emulate a larger set of breakpoint registers. However, efficient procedures to implement the emulation of breakpointing are desired. Novel emulation routines and data structures have been invented for use with a CPU having a RISC-type paging system.

In a paging system, a page table defines the mapping or translation between a program or virtual address generated by the user's program, and a physical address of a location in memory. Physical memory is divided into many pages, with each page being the same size, typically 4096 or 4K bytes. Each page begins and ends on a "page boundary", which is always a multiple of the page size, 4K bytes.

DEFINITIONS

A virtual address is composed of two parts: the lower 12 bits form the address within a page, or page offset, while the upper address bits determine which page is accessed. The upper bits of the virtual address are the virtual page number, and these upper bits are translated and replaced with a physical page number. The virtual page number is translated to a physical page number by either a page table in main memory, or by a cache of the page table such as a translation-lookaside buffer (TLB). The physical address is thus composed of the translated page number and the un-translated offset. Page tables and TLB's are well-known and are discussed more fully with respect to the x86 architecture in U.S. Pat. No. 4,972,338, issued in 1990 to Crawford and assigned to Intel Corporation of Santa Clara, Calif. A TLB is a small cache of the most recently used translations in the page tables. Inasmuch as the page tables are usually stored in main memory, accessing the page table for each memory reference adds significant overhead to each reference and slows the system down. Since each page table translation or entry covers 4K memory bytes, relatively few page table entries need to be cached by the TLB for a high hit rate and improved performance for most programs.

The term "virtual address" is often used rather loosely to refer to any address except the physical address. The physical address is output from the paging unit and is the actual address in memory of a datum. When both segmentation and paging are combined, a user program generates an "effective address", which is then translated by the segmentation unit to a "linear address". The linear address is then translated by the paging unit or a TLB to the "physical address". Sometimes the effective address and the linear address are referred to as virtual addresses.

TLB SUB-PAGE FIELDS FOR BOUNDS COMPARE LOGIC—FIG. 3

Figure 3:
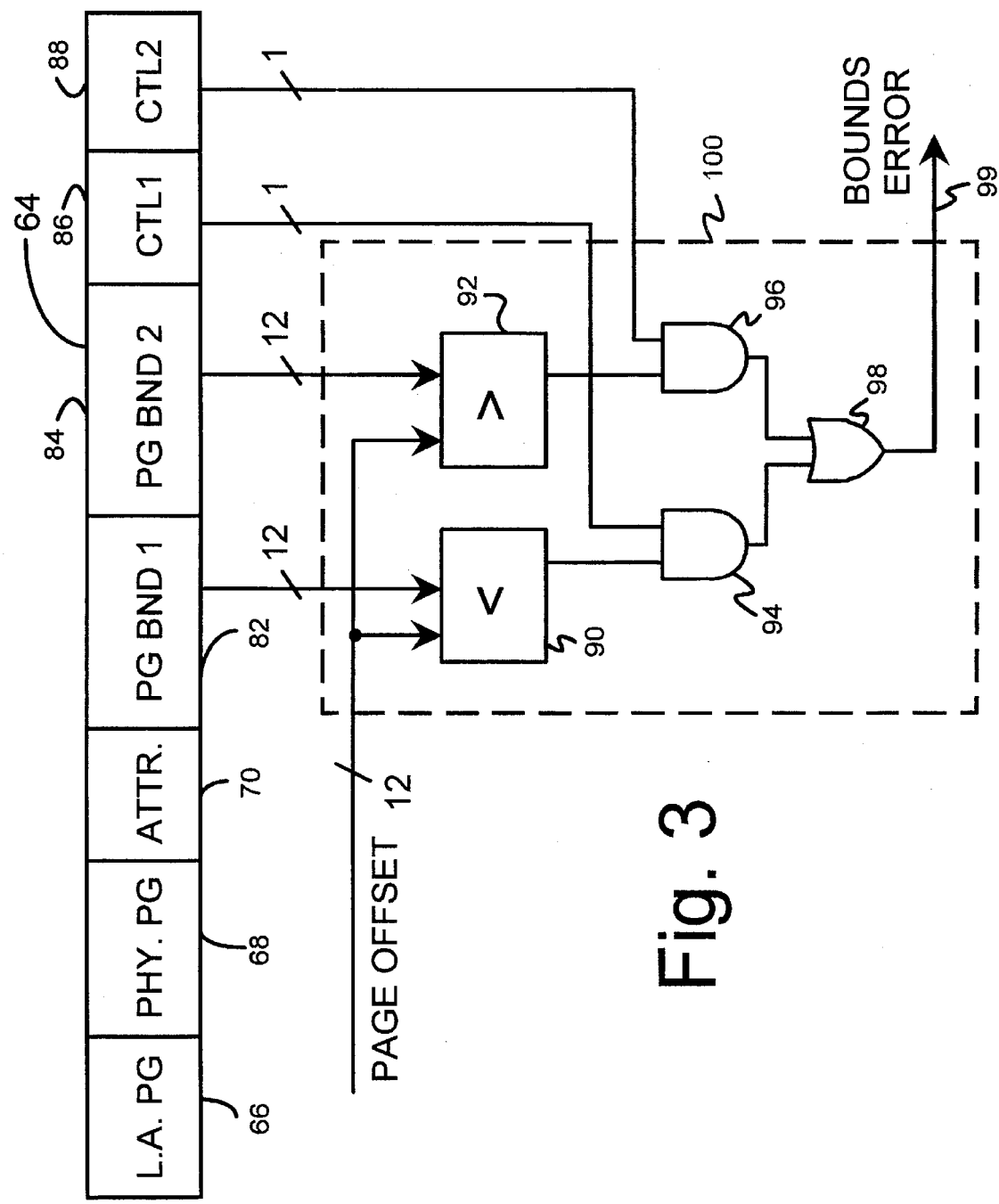
FIG. 3 shows in detail an embodiment for a TLB with sub-page validity.

FIG. 3 shows in detail an embodiment for a TLB with sub-page validity. The upper 20 bits of the 32-bit linear and physical addresses are stored in fields 66, 68, as in prior-art TLB's. Attributes are stored in attributes field 70. Two page offset bounds fields 82, 84 are provided that contain the 12-bit page offset of the boundary of the valid portion of the page, for partially-valid pages. Two control fields 86, 88 enable page offset bounds fields 82, 84, respectively. Each control field 86, 88 is one bit. When the control bit is high, comparison of the corresponding offset bounds field to the offset of the current linear address is enabled.

Two page offset bounds fields are provided in this embodiment for efficient encoding of pages with two events, which occur for small segments that lie entirely within a single page, program breakpoints, and faulty memory locations. These are typically small blocks within a page. Thus by having two page offset bounds fields, the starting and ending addresses for the small block may be specified. This is especially useful when multiple breakpoints occur within one page, as will be described in detail later.

The page offset bounds fields 82, 84 contain enough bits to specify the page offset down to the desired granularity. Thus for a 4K-byte page, which has 12 bits of address offset, 32-bit aligned word granularity requires that 10 bits be stored in each page offset bounds field 82, 84, while full byte-granularity requires that a full 12-bit offset address be stored in each page offset bounds field 82, 84.

Sub-page logic 100 includes comparison logic 90 which outputs a one to AND gate 94 when the 12-bit offset portion of the current linear address is less than the 12-bit offset bound stored in field 82. If the first control bit stored in control field 86 is also enabled (high), then an error will be signaled on bounds error line 99 from OR gate 98. Thus the first comparison signals an error when the linear address is below the first offset bounds.

The opposite type of comparison is performed for the second offset bounds field. Comparison logic 92 outputs a one to AND gate 96 when the 12-bit offset portion of the current linear address is greater than the 12-bit offset bound stored in field 84. If the second control bit stored in control field 88 is also enabled (high), then an error will be signaled on bounds error line 99 from OR gate 98. The second comparison thus signals an error when the linear address is below the first offset bounds.

Table 1 shows the encoding of control bits 86, 88 and how the 12-bit offset of the linear address is compared to the offset bounds fields. In Table 1, "y" refers to the value stored in first offset bounds field 82, while "z" refers to the value stored in second offset bounds field 84. Proper programming of these offset bounds fields and their control bits allows for checking the lower bound of the valid block, or checking the upper bound of the block. Comparison for both fields may be enabled to allow for checking of very small blocks that lie entirely within a single page.

TABLE 1

Encoding of Partial Page Control Bits

| Control Bits 86, 88 | Error if | Use |
| --- | --- | --- |
| 00 | Never | Clear Page, No Checking |
| 01 | >z | Block Upper Bound |
| 10 | <y | Block Lower Bound |
| 11 | >z OR <y | Block Within a Page |

Several types of events may be supported with two offset bounds and the encoding of Table 1. With the control bits 86, 88 set to "00", the entire page is valid. An encoding of "10" specifies that all addresses greater than the second offset bound 84 are valid, as when a segment or block begins within a page. The "01" encoding may be used for the end of a segment or block, when the upper bound ends within a page. Thus the first offset bound 82 specifies the upper limit of validity within the page. Encoding "11" specifies validity between the two offset bounds 82, 84, which may be used to specify a segment or block that lies entirely within a single page.

OVERVIEW OF INVENTION

Figure 1:
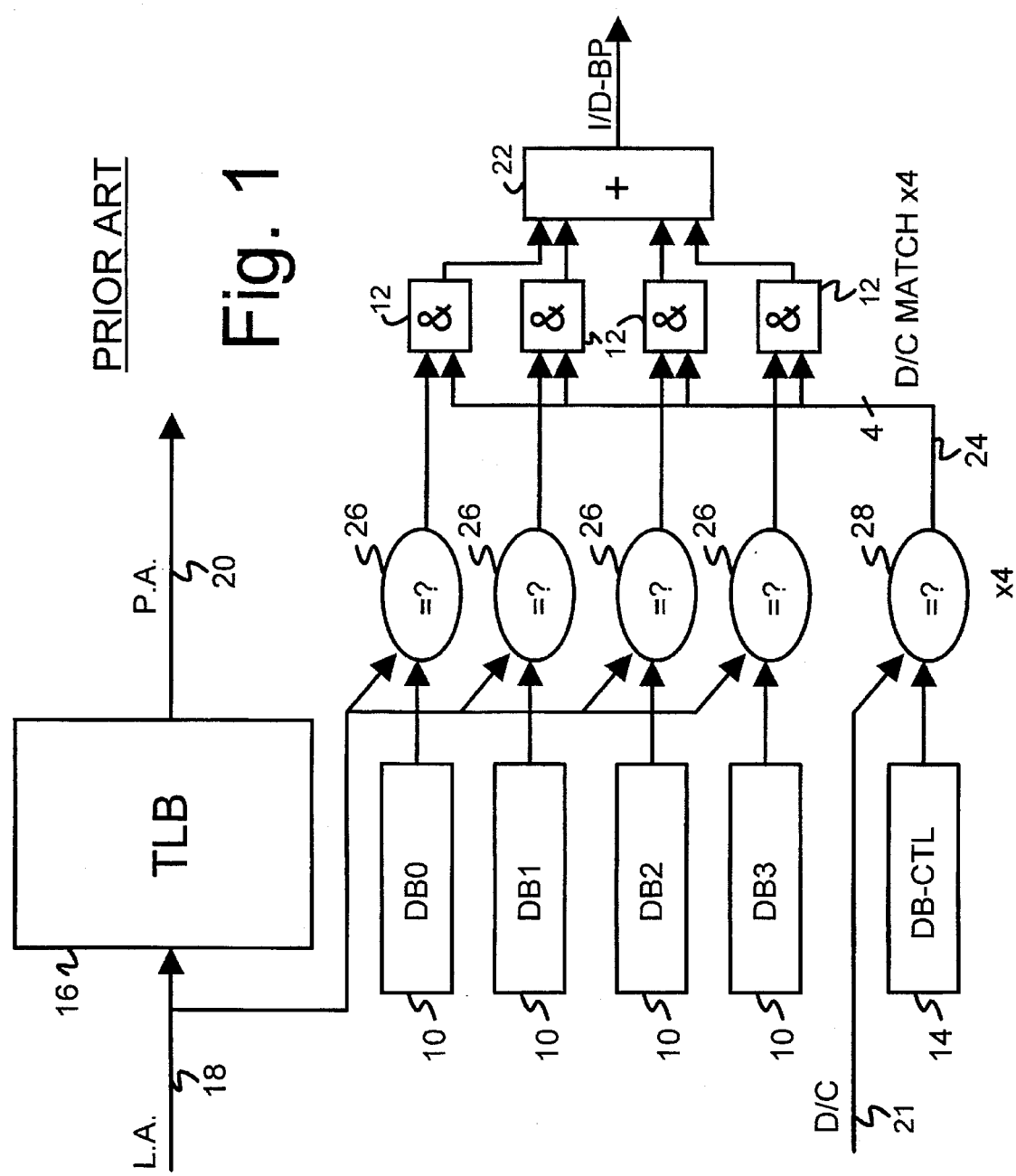
FIG. 1 is a block diagram of debug breakpoint hardware in a typical x86 processor, which includes paging.

A typical RISC CPU, as shown in FIG. 2, contains only one register for data operand breakpoints, and one for instruction breakpoints. Four CISC breakpoint registers (FIG. 1) can be emulated with the invention, which uses one of the single RISC breakpoint registers and the TLB. A standard TLB could be used for case (1) or (2) below, but the modified TLB of FIG. 3 is used for case (3), when two or more breakpoints fall within a page.

Three cases or possible configurations of the x86 CISC breakpoint registers are possible:

(1) Only one of the four x86 CISC breakpoint registers is enabled.

(2) Multiple x86 CISC breakpoints are enabled. Each breakpoint falls on a different 4 Kbyte page.

(3) Multiple x86 CISC breakpoints are enabled. Multiple breakpoints fall on the same 4 Kbyte page.

These three cases are handled separately. For the simplest case (1), the breakpoint address is simply loaded into the single RISC breakpoint register—either DABR or IABR. In all cases a basic rule is followed—that a breakpoint may have a page translation entry in the TLB only if that breakpoint is loaded into the single RISC breakpoint register (DABR or IABR).

Case (2) is more complex, having multiple breakpoints that must share a single breakpoint register. Since there is only one RISC breakpoint register, only one breakpoint can be loaded into this RISC register. The other breakpoint addresses are stored in emulation memory. These other breakpoints are prevented from triggering by removing their page entry from the TLB. Only the single 'active' breakpoint in the RISC breakpoint register may have its page entry in the TLB; the other breakpoints are 'disabled' by not having a valid entry in the TLB. For these 'disabled' breakpoints to trigger, their page entry must first be loaded into the TLB and the RISC breakpoint register overwritten with the 'disabled' breakpoint from emulation memory. The breakpoint that was 'active' in the RISC breakpoint register must have its TLB entry invalidated. A debug processing routine is added to the page fault routine to shuffle the breakpoints between the single RISC breakpoint register and emulation memory.

Case (3) is by far the most complex. Multiple breakpoints exist on a single page. The method for case (2) of swapping pages will not work when two breakpoints are on the same page.

The TLB allows a page entry to specify that only a portion of a page is valid instead of the entire 4 Kbytes. The page with multiple breakpoints is divided into non-overlapping sub-pages or portions, each portion containing a single breakpoint. Only one of the portions is loaded into the TLB at any time; the breakpoint in this loaded portion is 'active' and copied into the single RISC breakpoint register. The other breakpoints are left in emulation memory and 'disabled' by not having their portion(s) loaded into the TLB. Otherwise, the method for case (2) is used, or may be combined with case (3)'s method when multiple breakpoints occur on one page, and other breakpoints occur on other pages.

SOFTWARE HANDLER ROUTINE

Figure 4:
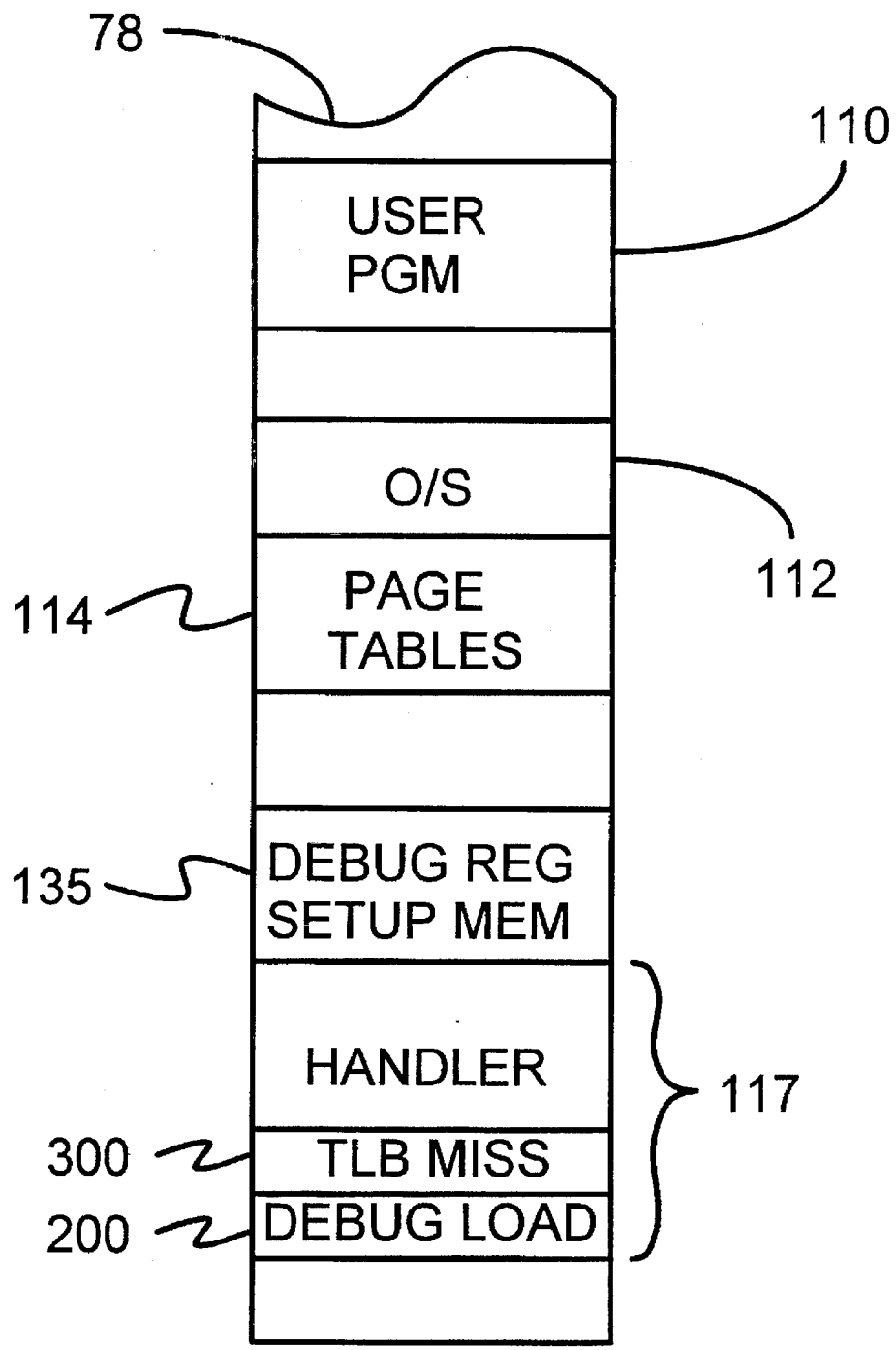
FIG. 4 is a diagram of a physical memory space which contains a user program, an operating system, and emulation handler routines.

These methods for cases (1), (2), and (3) are contained in two software routines shown in FIG. 4:

1. A debug processing routine in the TLB page miss handler or routine 300.

2. A debug load or setup routine 200 that emulates x86 instructions that alter the contents of the debug registers.

FIG. 4 is a diagram of a physical memory space 78 which contains a user program 110, an operating system 112, and emulation handler routines 117. Emulation handler routines 117 include several routines activated for different reasons. These routines include TLB page miss routine 300 and debug register load routine 200, detailed in FIGS. 5, 10. Page tables 114 reside near operating system 112, while debug register setup memory area 135 resides near emulation handler routines 117.

DEBUG PROCESSING FOR TLB PAGE MISS—FIG. 5

Figure 5:
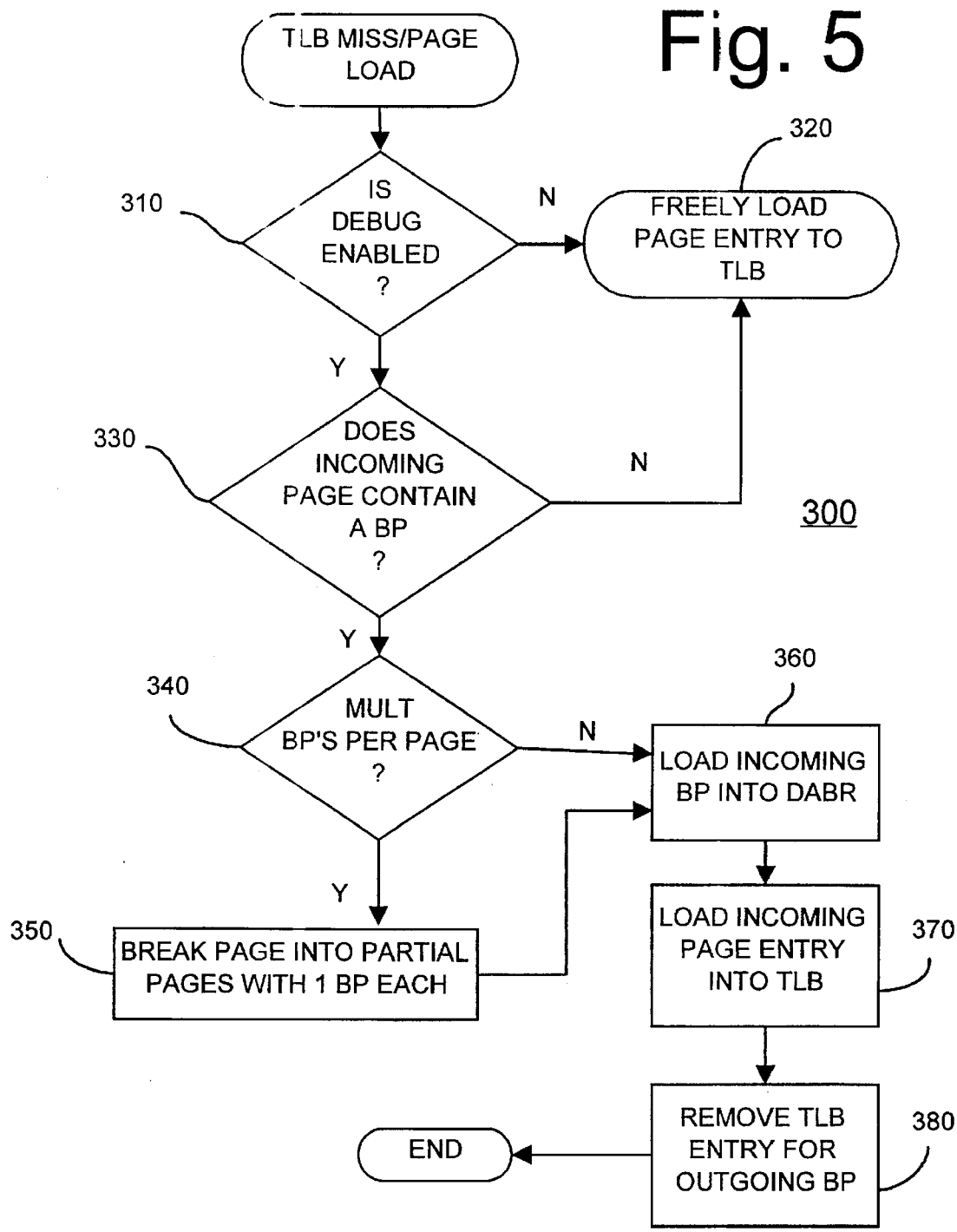
FIG. 5 is a debug processing routine executed when a page misses in the TLB.

FIG. 5 is a debug processing routine executed when a page misses in the TLB. Debug page miss routine 300 is called or entered from another emulation routine for processing page misses and loading translation entries from the page tables into the TLB. When debug breakpointing is disabled, routine 300 is quickly exited, reducing the impact on performance.

The first step 310 is to determine if breakpointing is enabled. This can be determined by reading a global enable bit in emulation memory or in the condition register. Higher performance is achieved by defining a bit in the RISC CR register 32 as a "debug active" bit, as described for FIG. 6.

Should debug be disabled, which is the normal condition for most programs, then debug routine 300 is exited (step 320), and the TLB miss routine can freely load the new page entry into the TLB. When step 310 determines that debug is enabled, then test 330 determines if the new or incoming page being loaded into the TLB contains a breakpoint. Test 330 can be accomplished by successively comparing the incoming page's upper page address to each breakpoint stored in emulation memory. If this incoming page does not contain a breakpoint, then again debug routine 300 may be exited, 320, and the incoming page freely loaded into the TLB.

If test 330 determined that the incoming page contained a breakpoint, then test 340 is performed to determine if multiple breakpoints exist on the incoming page. While test 340 could be accomplished by comparing the upper or page address of each debug register in emulation memory to the page address of the incoming page, this would require up to four comparisons and memory reads. A more efficient approach is to set a 'multiple breakpoints per page' bit in the CR condition register when two or more breakpoints exist on a page. Test 340 first reads this CR bit, and then compares the incoming page address to each breakpoint stored in emulation memory if the CR bit is set. If both the CR bit is set and the compare reveals that the incoming page is a page with multiple breakpoints on it, then the incoming page is broken into partial pages or portions, each portion with just one breakpoint, step 350.

The incoming breakpoint is read from the breakpoint registers in emulation memory and loaded into the RISC breakpoint register, either DABR or IABR, step 360. In step 370, the whole or partial page is loaded into the TLB. For partial pages, the upper and/or lower bound fields are loaded and their compare enable bits are set, as described for FIGS. 3 and 11. The TLB entry that contains the old or 'outgoing' breakpoint that was in the RISC breakpoint register is removed from the TLB in step 380. Step 380 can be performed by a TLB invalidate entry instruction or procedure, such as the PowerPC™ tlbie instruction, or by over-writing the old TLB entry.

An alternative to step 310 is to test if multiple breakpoints are enabled, instead of testing whether debug is enabled. If only one breakpoint is enabled, then there is no need to execute the rest of debug routine 300, as the single RISC debug register is already loaded with the only breakpoint address, and no page management is needed for debug processing. The 'multiple debug breakpoints active' bit in the CR register is checked instead of the 'debug active' bit in the CR register. For RISC processors with both a data operand and an instruction breakpoint register (DABR and IABR), up to one breakpoint of each type (data and instruction) may be loaded without requiring debug processing by the TLB miss handler.

CONDITION CODE REGISTER IDENTIFIES DEBUG SETUP

Figure 6:
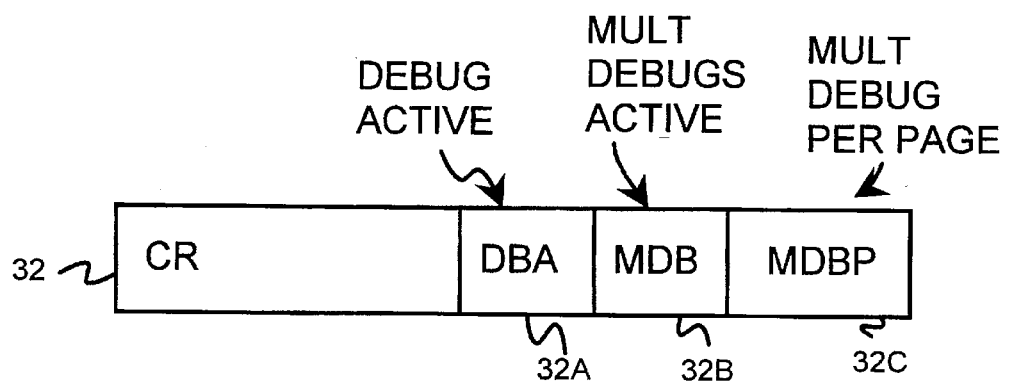
FIG. 6 is a diagram of the condition register CR on a RISC processor with bits defined for aiding debug emulation.

FIG. 6 is a diagram of the condition register CR on a RISC processor with bits defined for aiding debug emulation. CR register 32 is a 32-bit register on the RISC CPU die which is implicitly accessible by many instructions. For example, an add instruction may set a zero flag in CR register 32 when the result is zero. While many bits in CR register 32 are defined by the RISC architecture, other bits may be freely used. Of these freely-usable bits, the emulation handler defines up to three of them for use with debug emulation. Debug active bit 32A is set when any debug register is enabled and indicates that debug breakpointing is active. Multiple debug bit 32B is set when two or more breakpoints are enabled, regardless of where these breakpoints occur. Multiple debug per page bit 32C is set when multiple breakpoints fall within a single page. Thus the three debug bits 33A, 33B, 33C correspond to the three cases or configurations for the CISC debug breakpoint registers. Programming the configuration for the emulated debug registers into the CR register improves performance by as much as a factor of thirty since the access of the on-chip CR register is fast compared to an off-chip memory access to read the debug configuration in the emulation memory.

EMULATION OF DEBUG REGISTER SETUP

The CISC debug breakpoint registers are setup by moving binary addresses to these registers one at a time, and by enabling these registers by setting bits in the debug control register. When any of these debug setup instructions are encountered, debug register load routine 200 is initiated to emulate the instruction.

Figure 7:
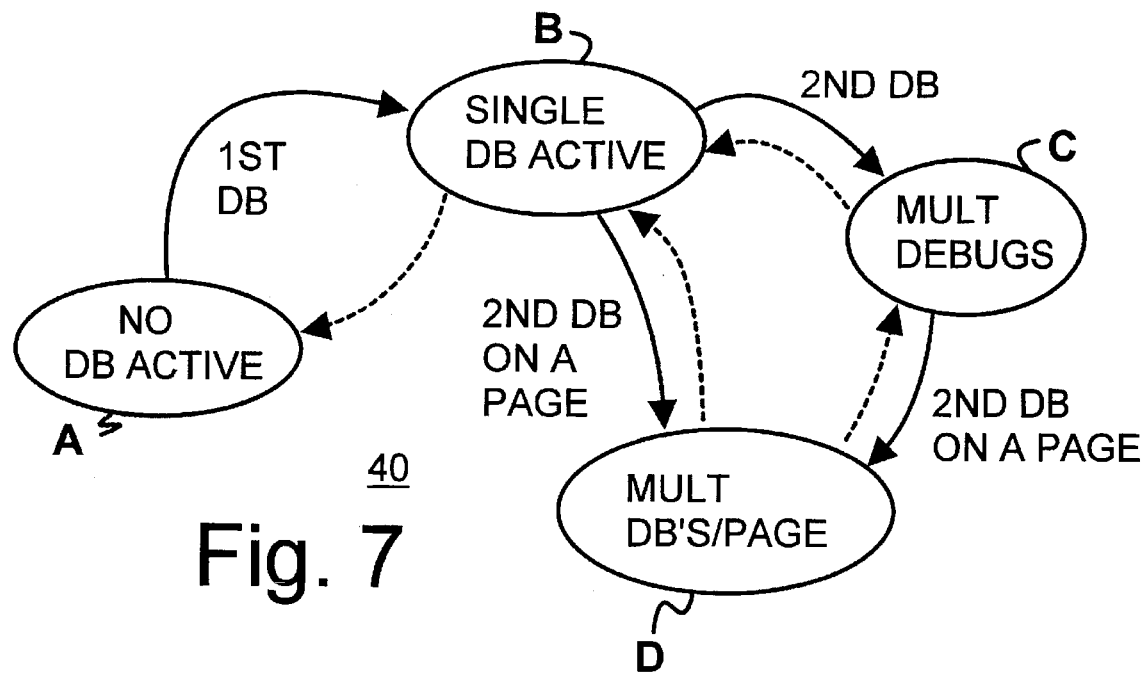
FIG. 7 is a state diagram of the debug setup sequence as debug register setup instructions are emulated.

FIG. 7 is a state diagram of the debug setup sequence as debug register setup instructions are emulated. At first, no debug registers are enabled, and state A is active. A binary address is first moved into one of the emulated CISC debug registers by copying this binary address to the debug register setup area of emulation memory. This debug register is enabled by an instruction which sets the enable bit for the emulated debug register. While in the prior art this instruction would physically set a bit in the CISC debug control register 14 of FIG. 1, this instruction is emulated, calling the debug load routine 200 of FIG. 4. Debug load routine 200 keeps track of how many of the four debug registers have been enabled, and if any two of the breakpoints fall within a single page.

State tracker 40 of FIG. 7 sequences through four states: A, B, C, D as debug registers are enabled or disabled, keeping track of the number of registers enabled and if multiple breakpoints are on a page. States B, C, D correspond to the three cases (1), (2), (3) respectively of possible configurations of the debug registers as described above in the overview section.

At first, no debug breakpoints are enabled. When the first breakpoint is enabled, the attempted execution of the debug enable instruction which sets the enable bit in the debug control register causes debug load routine 200 to be activated: State tracker 40 advances from state A to state B, indicating that one debug breakpoint has been enabled. The next attempt to execute the debug enable instruction will enable a second breakpoint, and state tracker 40 will usually advance from state B to state C. State C indicates that multiple breakpoints are enabled, but on different pages. A test will be performed by debug load routine 200 to determine if the newly-enabled debug breakpoint lies on the same page as another breakpoint. If so, then multiple breakpoints exist on the same page, and state D rather than state C will be entered from state B. Alternatively, if two or more breakpoints have already been enabled, and the new breakpoint lies in the same page as an existing breakpoint, then stage D will be entered from state C.

Other instructions will disable existing breakpoints, also causing debug load routine 200 to be activated. States D, C, and B may then be exited for states C, B, or A, as indicated by the dotted arrows of FIG. 7. While state tracker 40 could be implemented using flip-flops on the CPU die, it is preferably coded into debug load routine 200, with the current state being stored in emulation memory.

STORAGE STRUCTURES IN EMULATION MEMORY—FIG. 8

Figure 8:
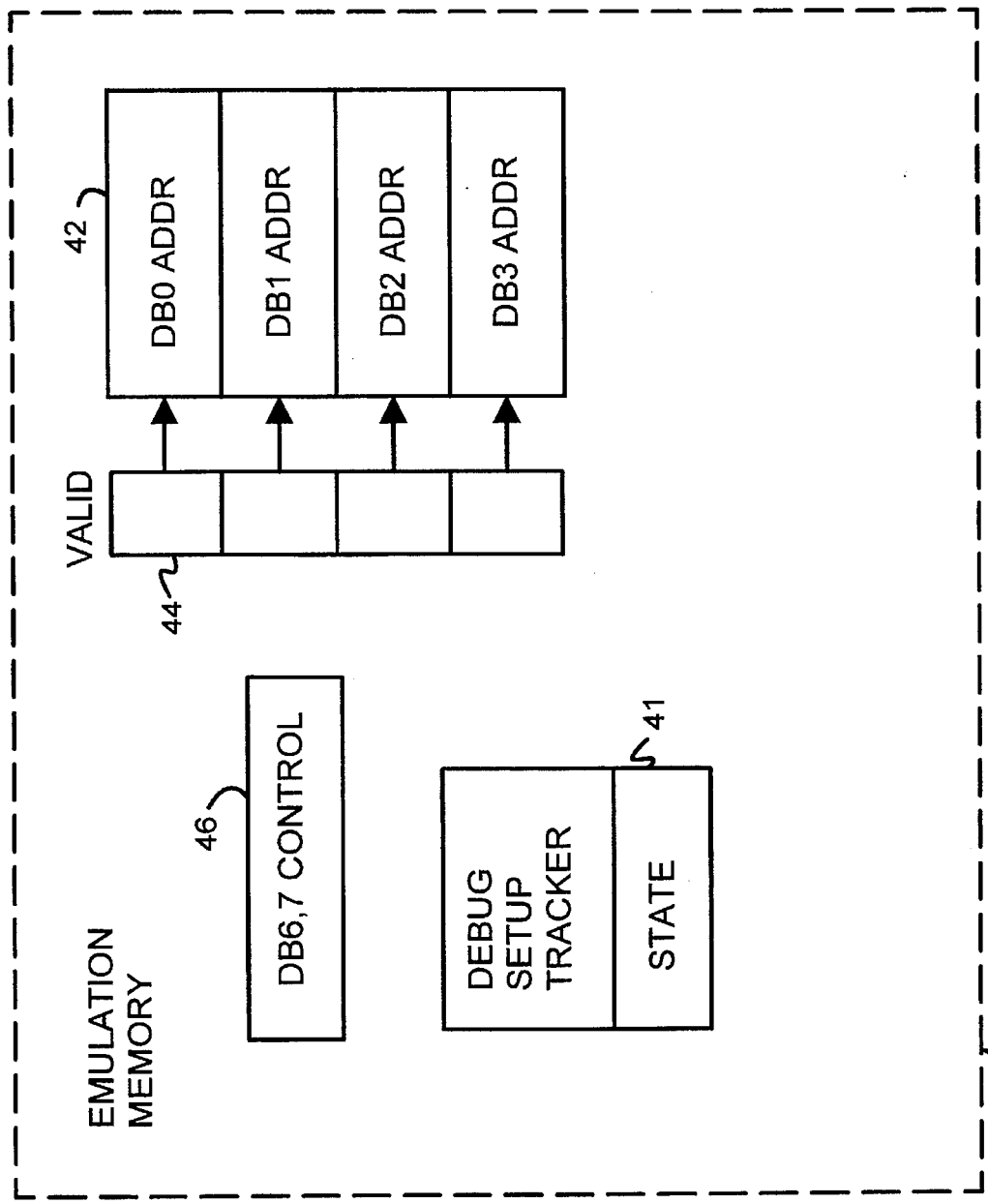
FIG. 8 shows the storage structures in emulation memory that are maintained by a debug load routine and a TLB miss routine with debug processing.

FIG. 8 shows the storage structures in emulation memory that are maintained by debug load routine 200 and TLB miss routine 300. Emulation memory includes debug register setup memory area 135 for storing information on the setup of the emulated CISC debug registers. The current state 41 of state tracker 40 is stored as a simple 2-bit binary number in memory area 135.

The breakpoint addresses for the four x86 CISC debug registers which are being emulated are stored in debug emulation table 42 of memory area 135. Four valid bits 44 are set or cleared to indicate if each of the four debug breakpoints in table 42 are enabled. Alternatively, a separate debug control register 46 may be set up in memory area 135.

DEBUG REGISTER LOAD ROUTINE—FIG. 9

Figure 9:
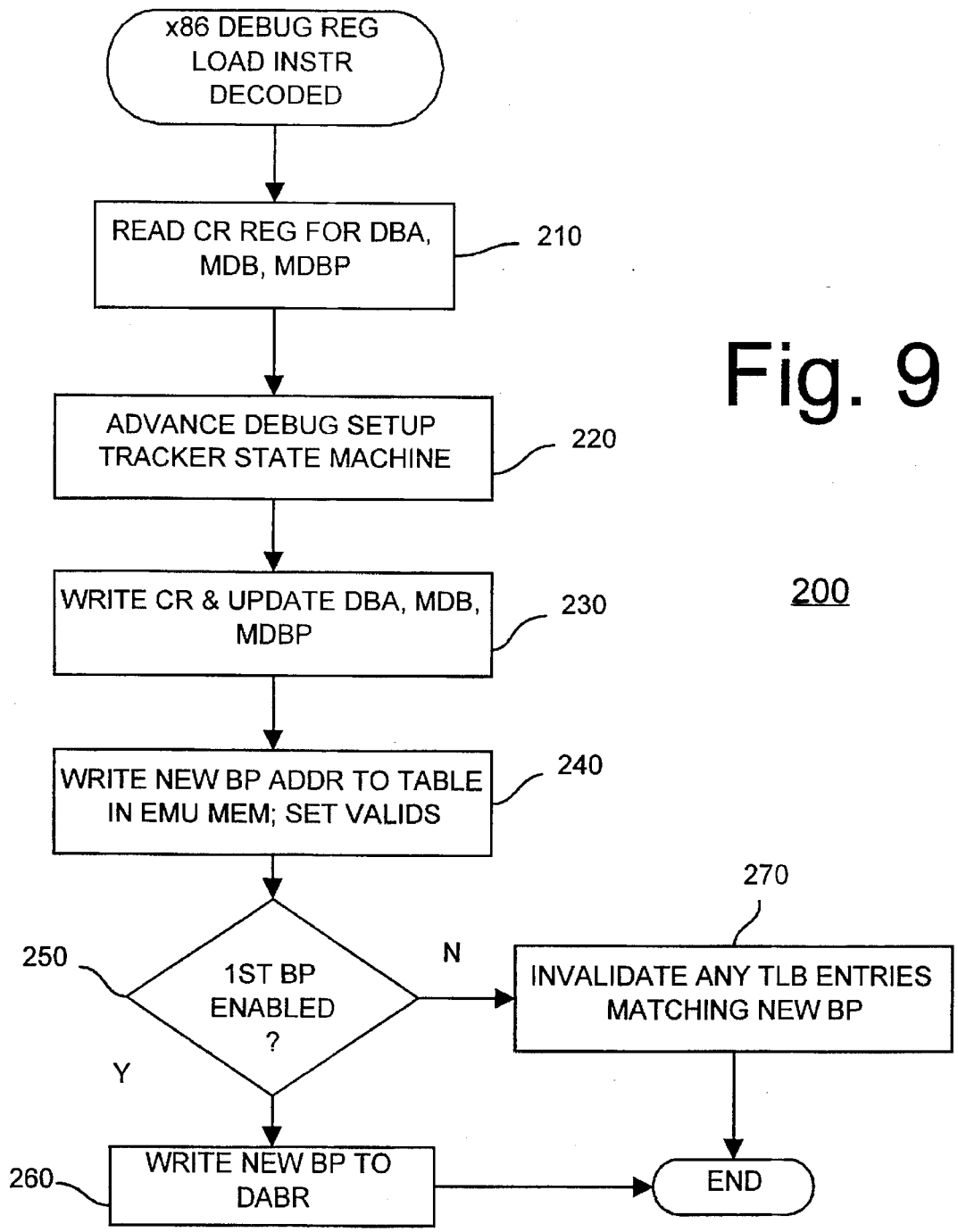
FIG. 9 is a routine that emulates a debug register load instruction.

FIG. 9 is a routine that emulates a debug register load instruction. When an instruction is decoded that enables one of the four CISC debug breakpoint registers, debug load routine 200 is activated. The condition register CR is read for the debug active, multiple debug, and multiple debugs per page bits. The debug tracker 40 is advanced to the next state in step 220, as described in FIG. 7. It may be necessary in step 220 to compare the page address of the incoming breakpoint to the page addresses of the existing, already-loaded breakpoints to determine if the incoming breakpoint falls on the same page as an existing breakpoint. The CR register is written in step 230 to update the debug active, multiple debug, and multiple debugs per page bits to correspond to the new state of state tracker 40. The new or incoming breakpoint address is written to one of the four debug address register DB0-DB4 in the debug area 135 of emulation memory, or the valid bit for that register is set or cleared, step 240.

The valid bits for the four debug address registers are checked, step 250, to determine if this is the first breakpoint to be programmed. If so, then the breakpoint address is copied to the RISC breakpoint register (DABR or IABR) on the CPU die, step 260. Otherwise, the TLB must be searched for any page entries having a page address matching the incoming breakpoint. The PowerPC™ RISC architecture provides a TLB invalidate entry instruction (tlbie) which invalidates an entry in the TLB that matches the address supplied. Thus a simple tlbie instruction may be executed. These matching entries must be invalidated, step 270. A full TLB flush could be substituted for step 270 with a loss of performance.

MULTIPLE BREAKPOINTS ON A PAGE—FIG. 10

When two or more breakpoints lie on the same page, the TLB miss routine 300 is modified to load a partial page into the TLB rather than the whole page. The upper and lower bounds of the partial page are computed and loaded into the bounds fields of the TLB entry for the partial page. The bounds checking enable bits are also set, as described for FIG. 3. These upper and lower bounds can be pre-computed by the debug load routine 200 and stored in the debug area 135 of emulation memory, or the bounds can be computed when the page is loaded during step 370 of routine 300.

Figure 10:
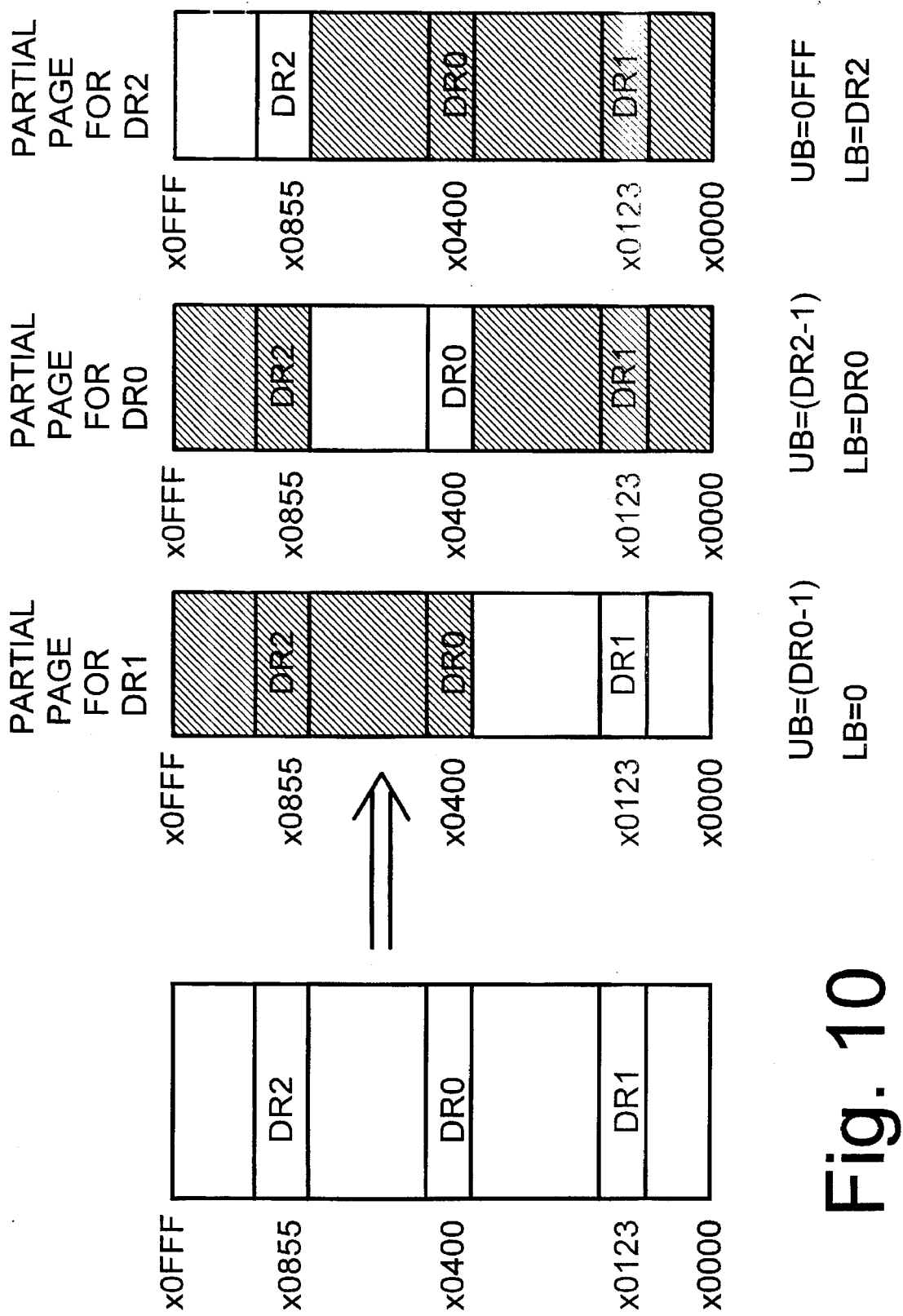
FIG. 10 shows partitioning of a page which contains three breakpoints into partial pages.

FIG. 10 shows partitioning of a page which contains three breakpoints into partial pages. The 4-Kbyte page has offset addresses within the page ranging from 0x0000 to 0x0FFF hex. At offset 0x0123 is the breakpoint programmed into CISC breakpoint register D1. Offset 0x0400 is the breakpoint programmed into CISC breakpoint register DB0, while offset 0x0855 is the breakpoint programmed into CISC breakpoint register DB2.

This 4-Kbyte page is divided into three non-overlapping partial pages, each partial page containing just one breakpoint. The first partial page contains the first (DB1) breakpoint at 0x0123. The lower bound is set to the lowest offset address on the page, 0x0000, while the upper bound is set to the last offset address before the next breakpoint at 0x400. Thus the first partial page only contains the first breakpoint at 0x0123, with the lower and upper bounds set to 0x0000 and 0x03FF. These values would be programmed into the bounds fields 84, 82 in the TLB entry when this partial first page is loaded into the TLB.

The second partial page contains the second breakpoint at offset 0x0400. The lower bound is set to this breakpoint's address, 0x0400, while the upper bound is set to the last offset address before the next (third) breakpoint at 0x0855. Thus only addresses between 0x0400 and 0x0854 will be valid for the second partial page, and other offset addresses on this page will cause a page fault when the second partial page is loaded in the TLB. Another partial page will be loaded into the TLB when the offset is outside the resident second partial page.

The third partial page contains the third breakpoint (DR2) at 0x0855. The lower bound is 0x0855 while the upper bound is the last offset on the page, 0x0FFF, since there are no more breakpoints on this page.

The first, second, or third partial page is selected for loading into the TLB based on the page faulting address. If the address of the page fault lies within the second partial page, then the second partial page is loaded into the TLB. Likewise for the first or third partial page. The offset address locations of the breakpoints in registers DB0, DB1, and DB2 is for illustration only, and can easily be in a different order.

EXAMPLE OF DEBUG LOADING—FIGS. 11A, 11B

Figure 11A:
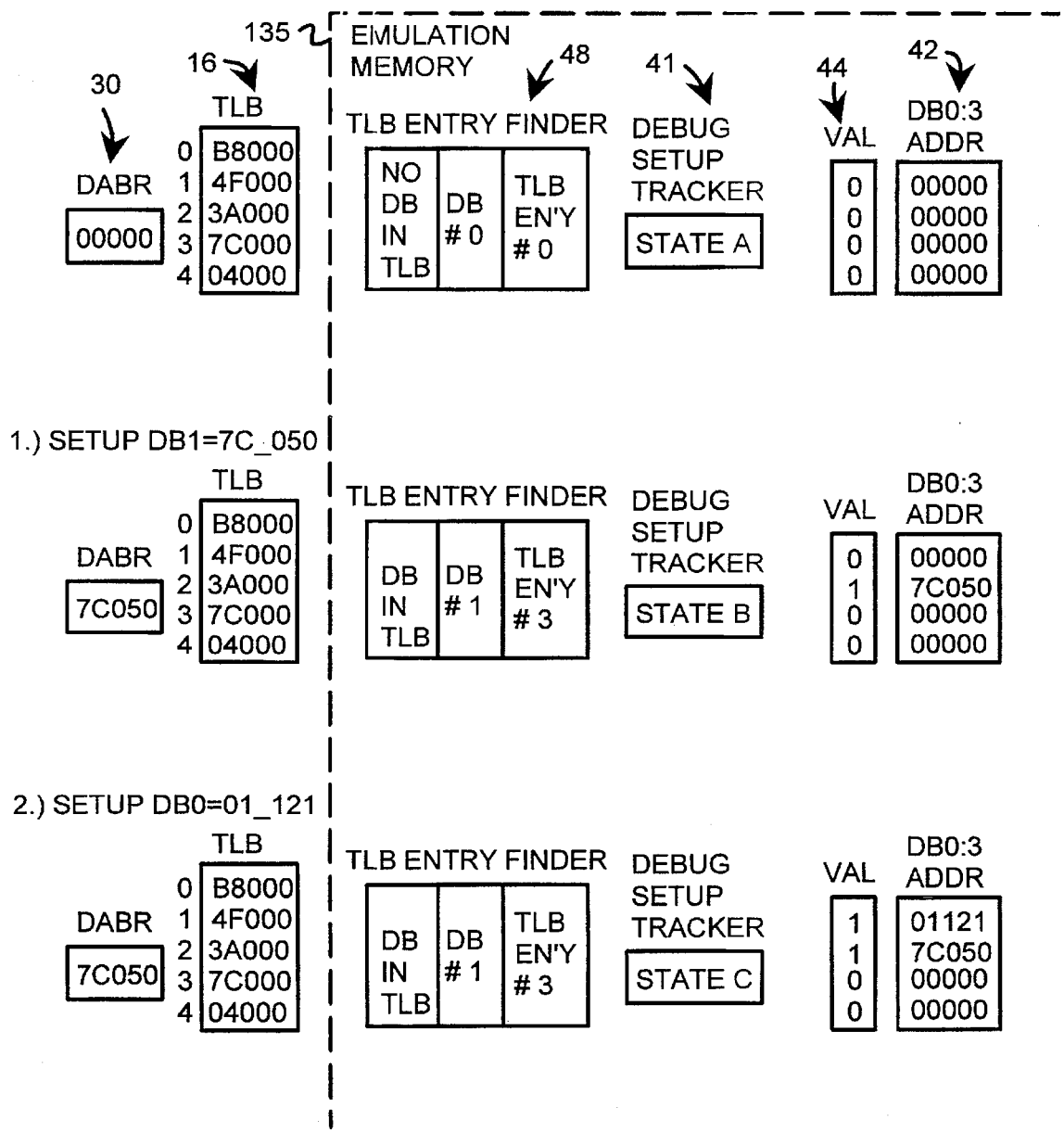
FIGS. 11A, 11B show an example of how the storage structures in the debug setup area of the emulation memory are modified as debug registers are loaded and enabled.
Figure 11B:
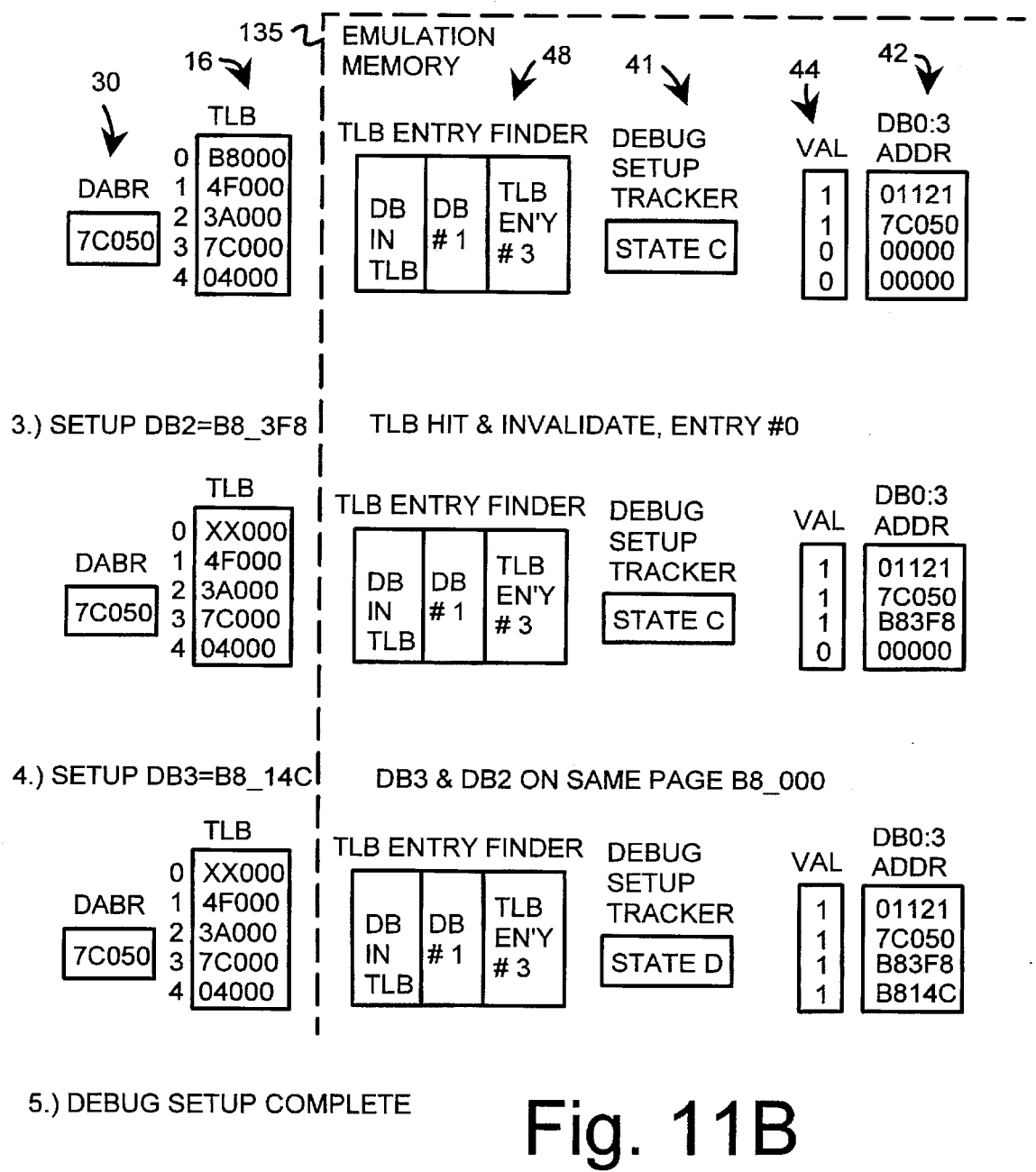

FIGS. 11A, 11B show an example of how the storage structures in the debug setup area 135 of the emulation memory are modified as debug registers are loaded and enabled. This example shows the worst-case of all breakpoints being data operand breakpoints, so data address breakpoint register DABR 30 is shown on the RISC CPU die. The TLB 16 is also shown as having five page entries for simplicity. Addresses are shown in DABR 30, TLB 16, and debug emulation table 42 as 5-digit hexadecimal addresses. Since the page size is 4 Kbytes, the lower three hex digits are the offset address within a page, while the upper two hex digits are the page number or address. These 5-digit hex addresses are sometimes written with an underscore character to emphasize the separation between the page and offset addresses. The address 7C_050 is equivalent to 7C050, having a page address of 7C and an offset within the page of 050.

The debug setup area 135 of emulation memory contains debug tracker current state 41, CISC debug emulation table 42, and valid bits 44 for these four CISC debug breakpoint registers DB0, DB1, DB2, DB3. A TLB entry finder 48 is also shown to indicate if any debug breakpoints are in the TLB, and if so, what debug breakpoint and which TLB location. This TLB entry finder is for illustration and may not necessarily be present in emulation memory 48. FIGS. 11 and 12 show how the data values within these structures change as various operations occur.

Initially, as shown at the top of FIG. 11A, DABR contains 00000, while page addresses B8, 4F, 3A, 7C, and 04 are stored in entries 0 to 4 of TLB 16. No debug breakpoints have yet been enabled, so debug emulation table 42 and valid bits 44 are all cleared to zeros. No debug breakpoints are currently in the TLB. The current state 41 of the state tracker 40 is state A.

1.) The first operation is to setup the second debug register DB1. The breakpoint address 7C_050 is loaded into DB1 and this CISC emulation register is enabled by setting its valid bit 44. This requires two discrete x86 instructions, one to move the breakpoint address and the second to enable the debug register.

Since this is the first breakpoint to be enabled, its breakpoint address is copied onto the RISC CPU and loaded into the single RISC breakpoint register DABR 30. The current state 41 advances to state B, and the debug active bit in condition register CR is set (not shown). A page entry having a breakpoint is now present in the TLB, since entry 3 of TLB 16 already contains page address 7C, which matches breakpoint's 7C_050 page address.

2.) The second operation is to load and enable the first debug register DB0 with breakpoint address 01_121. Valid bits 44 are updated to show both DB0 and DB1 valid, and current state 41 advances to state C, indicating that multiple debug breakpoints are enabled, but not on the same page. The page address for the new breakpoint is 01, which does not match any entries in the TLB. DABR 30 is not changed.

3.) The third operation, shown on FIG. 11B, is to setup the third CISC debug register DB2. breakpoint address B8_3F8 is loaded into the third register of debug emulation table 42 and valid bits 44 are set for three valid breakpoints. The current state remains at state C since all three breakpoints have different page addresses—01, 7C, and B8. The page address for the new breakpoint is B8, which matches entry 0 in the TLB. Thus TLB entry 0 must be invalidated since the new breakpoint is not loaded into the only RISC breakpoint register, DABR 30.

4.) The fourth operation is to load the last (fourth) debug register DB3 with breakpoint B8_14C. All valid bits 44 are now enabled. State D is entered because both DB2 and DB3 fall within the same page, the page starting at address B8_000. However, page B8 was invalidated in TLB 16 in operation 3, do no further changes to TLB 16, or DABR 30 are needed. However, condition register CR is updated to set the multiple debugs per page bit to indicate that case (3) now exists.

5.) The setup of the CISC debug emulation registers is now completed. The single RISC breakpoint register 30 contains the breakpoint for DB1, and entry 3 in the TLB as has the DB1 breakpoint.

EXAMPLE OF DEBUG PROCESSING—FIGS. 12A, 12B, 12C

Figure 12A:
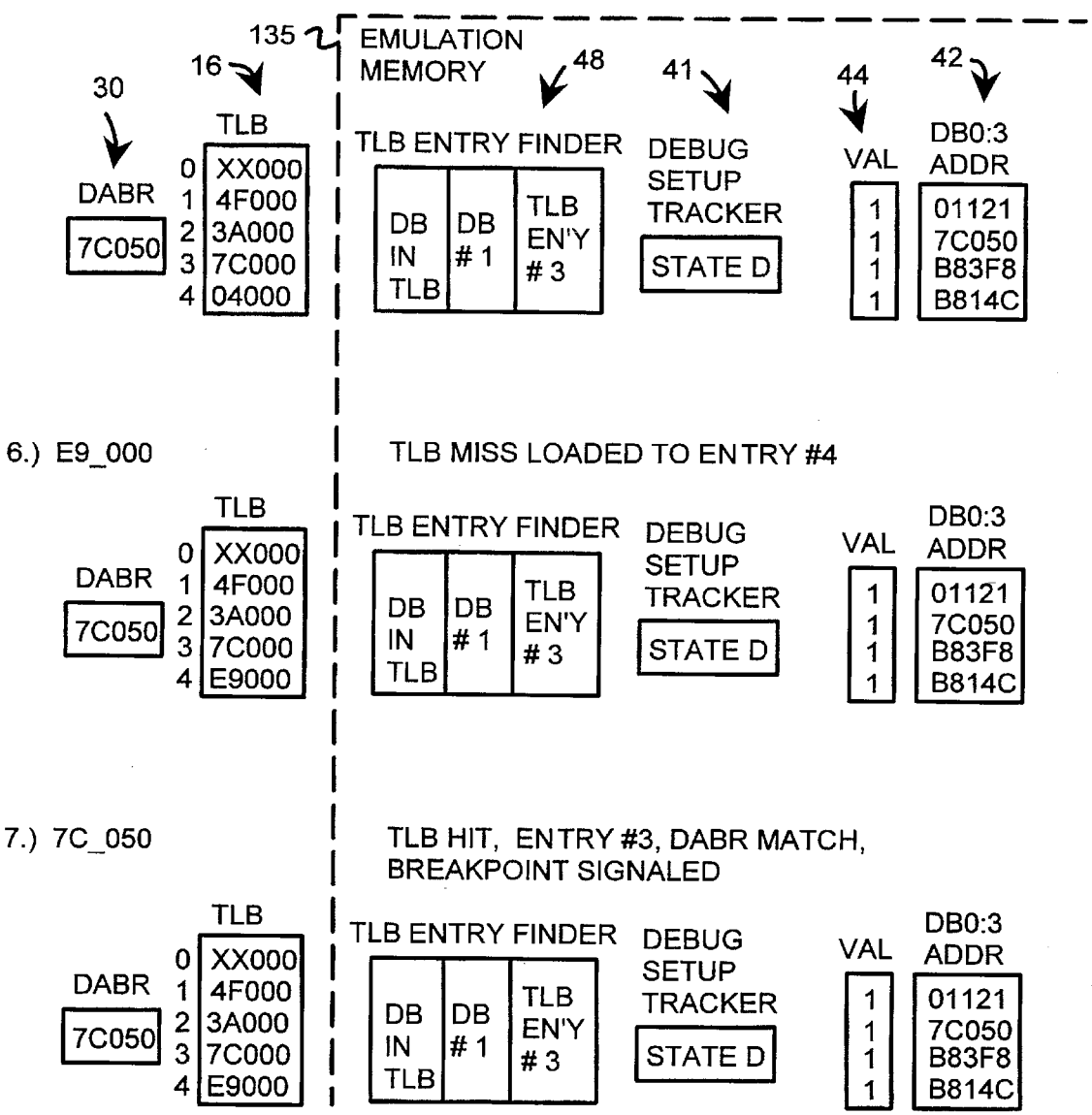
FIGS. 12A, 12B, 12C show an example of how the TLB and RISC breakpoint register DABR are modified as page misses and hits occur.
Figure 12B:
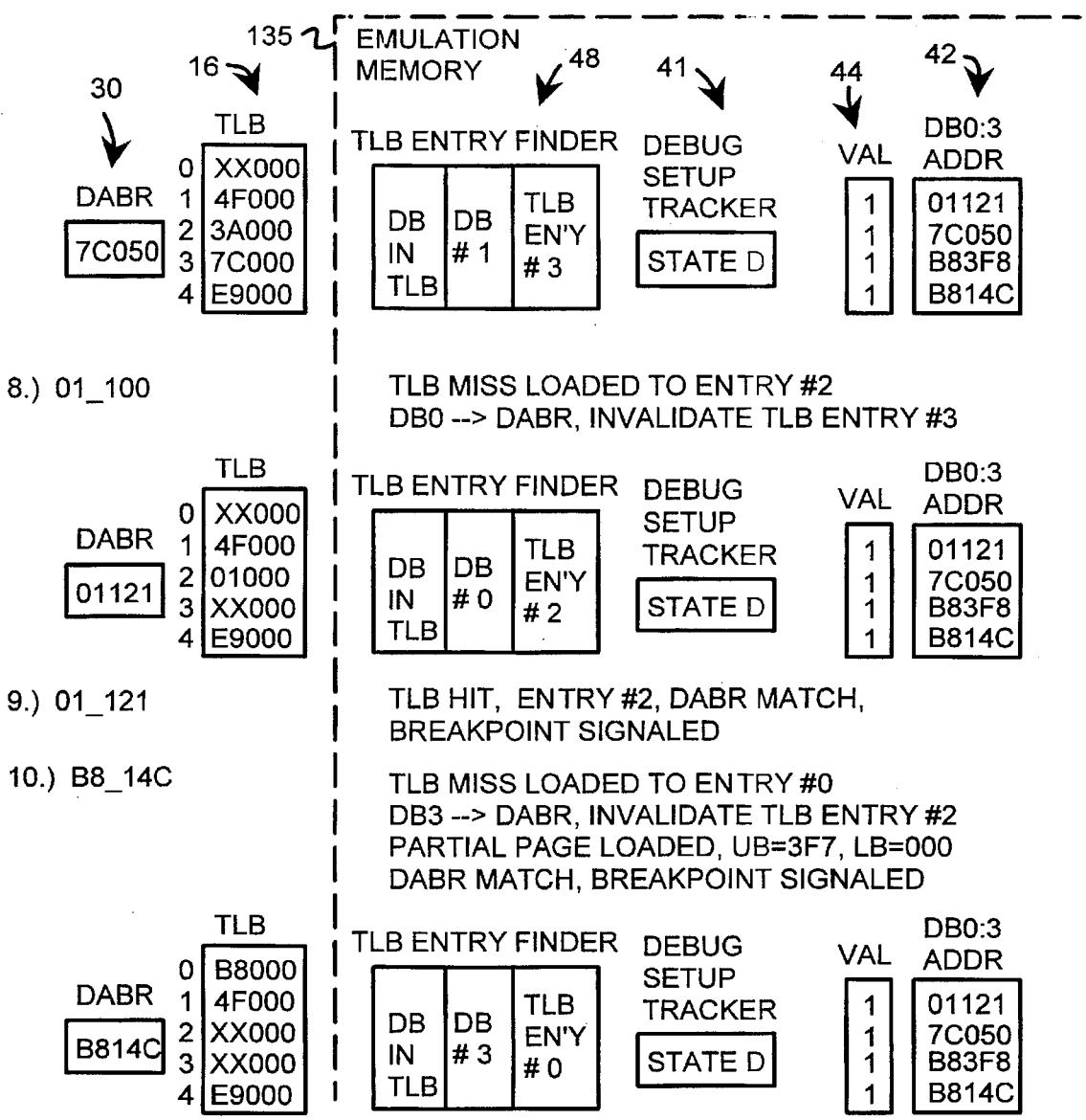
Figure 12C:
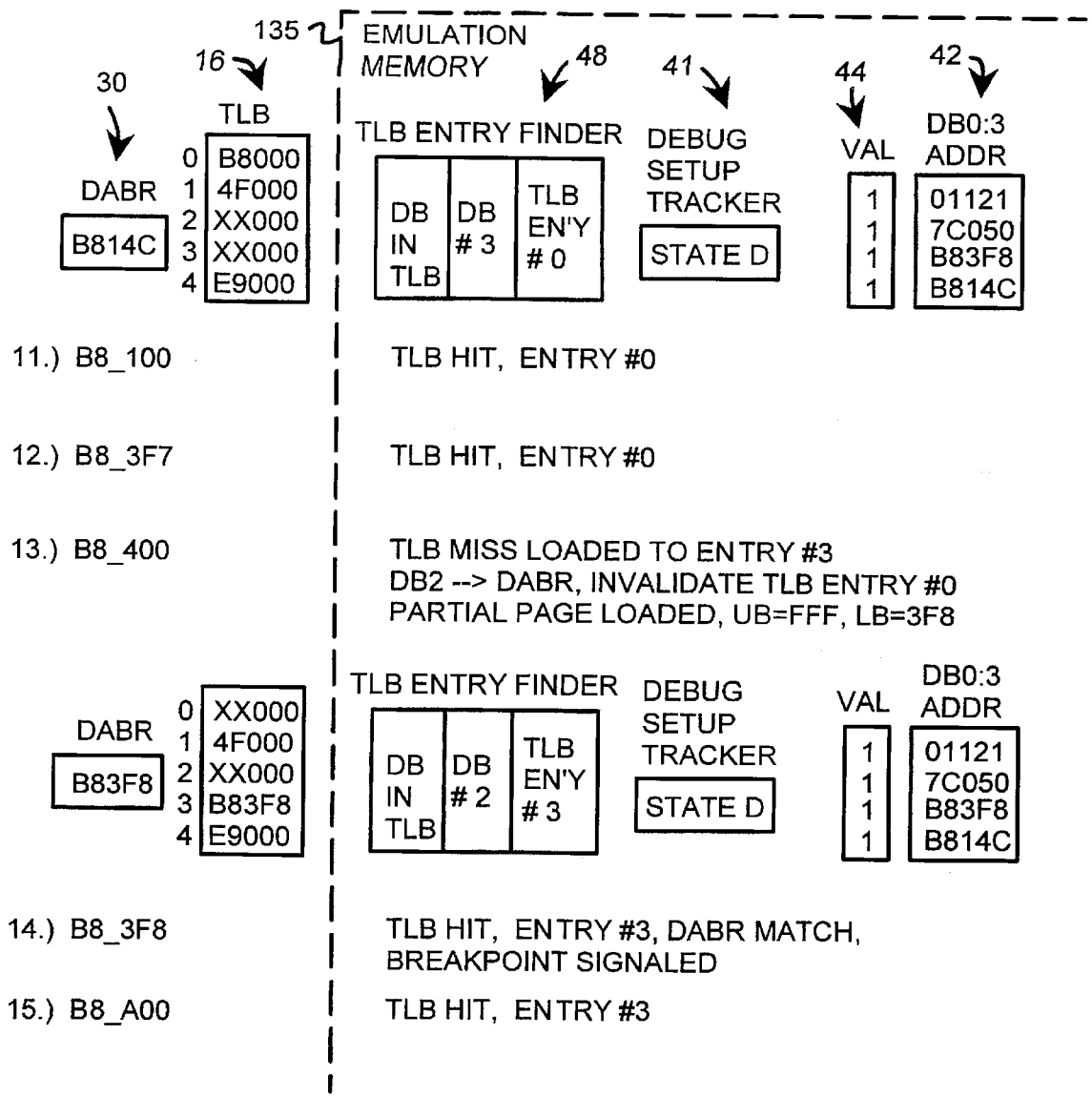

FIGS. 12A, 12B, 12C show an example of how the TLB and RISC breakpoint register DABR are modified as page misses and hits occur. The top of FIG. 12A shows the setup of these storage structures after the debug setup of FIGS. 11A, 11B are completed by operation 5.

6.) The first memory reference is to address E9_000. No entry in TLB 16 matches page E9, so a TLB miss occurs. Page E9's page translation entry is loaded into location 4 of TLB 16, which might be the least-recently-used location in TLB 16. Since none of the breakpoints in debug emulation table 42 falls within page E9, no further debug processing is needed.

7.) The next memory reference is to address 7C_050. This is a TLB hit, since TLB entry 3 already contains page 7C. This address, 7C_050 matches the breakpoint address in the single RISC breakpoint register DABR 30, so a breakpoint is signaled by the RISC CPU. This breakpoint can be quickly signaled as the RISC hardware register DABR is used to signal the breakpoint. No access of emulation memory 135 is needed.

8.) Memory reference 01_100, on FIG. 12B, is a TLB miss since page address 01 is not present in TLB 16. This page is loaded into TLB entry 2. A comparison of the breakpoint addresses in debug emulation table 42 reveals that breakpoint DB0 at address 01_121 falls within this new page starting at 01_000. Thus this new 'incoming' breakpoint address 01_121 must be written to DABR 30. The incoming breakpoint over-writes the old 'outgoing' breakpoint 7C_050 which was in DABR 30. However, the outgoing breakpoint still has its page entry in TLB 16. While a search of TLB could be performed to locate the outgoing page entry, a TLB invalidate entry instruction, tlbie, is executed to invalidate the old breakpoint's entry in the TLB, which is TLB entry 3. Thus TLB entry 3, which is for page 7C, is invalidated. The TLB location of the new 'incoming' breakpoint is TLB entry 2, for debug emulation registers DB0.

9.) Memory reference 01_121 hits the TLB for page address 01, which is TLB entry 2. This memory reference is to the breakpoint address in the RISC breakpoint register DABR 30, and thus a breakpoint is signaled. Emulation memory is not referenced as the breakpoint is signaled by the RISC hardware.

10.) Memory access to address B8_14C is a TLB miss. Since page B8 contains two breakpoints, a partial page entry must be loaded into TLB 16. Page B8 is divided into two partial pages. Address B8_14C falls within the first partial page, and upper and lower bounds of 3F7 and 000 are loaded into the bound fields 84, 82 for TLB entry 0 (bound fields are not shown in FIG. 12 but are shown in FIG. 3).

The breakpoint falling within the partial page loaded into TLB 16 is B8_14C, stored in emulation memory in debug emulation register DB3. This breakpoint address is loaded into RISC breakpoint register DABR 30. The outgoing breakpoint's TLB entry is located using a tlbie instruction which invalidates location 2 in the TLB.

Since the memory reference, B8_14C, is to the incoming breakpoint loaded into RISC breakpoint register DABR 30, a breakpoint will be signaled by the RISC CPU once the debug processing routine 200 and the TLB page miss routines finish. While the RISC hardware quickly reports the breakpoint, the software page miss and debug processing routines are relatively slow, and thus the breakpoint will not be reported as quickly as when the RISC breakpoint register DABR 30 is already loaded. This type of delay should be rare, since it will only occur when a jump occurs to the exact breakpoint from another page.

11.) The next memory reference to address B8_100, shown on FIG. 12C, is a page hit to the partial page loaded by operation 10.

12.) The next memory reference to address B8_3F7 is also a page hit to the partial page loaded by operation 10. However, address B8_3F7 is at the upper bound of the partial page.

13.) The next reference is to address B8_400, just a few bytes above the last reference in operation 12. This memory reference is to the same 4 Kbyte page, and would be a page hit is debug processing were not enabled. However, this reference is to the other partial page, and is a miss to the partial page currently loaded into TLB location 0 for breakpoint DB3.

A TLB invalidate entry instruction is used to locate the outgoing TLB entry at location 0, which is invalidated. The incoming partial page contains breakpoint DB2, which is loaded into RISC breakpoint register DABR 30. The incoming partial page is loaded to entry location 3 in TLB 16, with the upper bound field set to FFF and the lower bound field set to 3F8, the offset of the incoming breakpoint B8_3F8. TLB location 3 holds breakpoint DB2.

14.) The memory reference B8_3F8 is a page hit for location 3, the partial page loaded in operation 13. This reference is to the first valid offset on the partial page, which is the breakpoint for debug emulation register DB2. Thus the RISC hardware detects a match with RISC breakpoint register DABR 30 and signals the breakpoint.

15.) Finally memory reference B8_A00 is a page hit to the partial page loaded in operation 13.

ALTERNATE EMBODIMENTS

Several other embodiments are contemplated by the inventors. The invention has been described as using a single RISC breakpoint register. However, the invention can easily be adapted for two or more breakpoint registers. For example, PowerPC™ RISC processors may have two breakpoint registers—DABR for data operands and IABR for instructions. A simple embodiment is to load DABR when the CISC breakpoint is for a data operand, but load IABR when the CISC breakpoint is for instructions. The four CISC debug breakpoints stored in the emulation memory area may be allocated to either IABR or DABR, depending upon the type of breakpoint programmed instruction or data operand. The state tracker, and four emulated CISC debug registers can be duplicated for instruction and data breakpoints. Thus both DABR and IABR could be simultaneously used, possibly increasing performance. A TLB entry finder may be set up in emulation memory to aid locating TLB entries for removal or invalidation. When several TLB's exist on the CPU, then the invention may easily be adapted by ensuring that all TLB's in combination do not have more than one page containing a breakpoint.

A page size of 4096 bytes was described with reference to the embodiments, but other page sizes and address sizes may be easily substituted by one skilled in the art. Many other combinations of the embodiments disclosed are possible in light of the teachings herein.

While an embodiment with only two page offset bounds fields 82, 84 (FIG. 3) has been explained, it would be obvious for one skilled in the art to employ a different number of offset bounds fields or a different number of encoding control bits 86, 88. For example, the encoding may be changed for greater than or equal to a page offset bound value, and still fall within the spirit of the invention. Additional control bits may also be added. A "100" encoding could specify that the entire page is valid except the region between the two offset bounds 82, 84. This is useful for watchpoints and disabling faulty memory locations. Any reference between the two bounds 82, 84 would cause a page fault.

The page with multiple breakpoints was partitioned by setting the upper bounds to the breakpoints or the last address on the page. Other partitioning methods may be used. Higher performance may be achieved by breaking the page at intermediate boundaries such as on an aligned 1 Kbyte boundary. Another partitioning method is to make one or more of the partial pages as large as possible, as was done for the first partial page.

Another embodiment requires no breakpoint register at all on the CPU. Pages containing a breakpoint are never loaded into the TLB. Only pages without breakpoints are loaded into the TLB. All references to pages with breakpoints will cause a TLB miss. The TLB miss handler operates as described, except that breakpoint pages are not loaded into the TLB. At the point that the new partial page would otherwise be loaded into the TLB, the TLB miss handler must emulate the memory reference causing the page fault, or load a special one time TLB entry that will be valid for only one reference, after which it will become invalid. The one-time TLB entry is described in the parent patent. The debug load and TLB miss emulation routines described herein may be applied to these other embodiments described at length in the parent patent.

A partial page that does not include the breakpoint can also be loaded into the TLB. The on-chip RISC breakpoint register is not used in this embodiment. Instead, the partial page will have a page fault when the breakpoint's address is reached. The page fault routine would then signal the breakpoint rather than the CPU's hardware. This embodiment works particularly well when multiple breakpoints occur on the same page.

The TLB miss routine of FIG. 5 may be modified to reduce or eliminate the CR bits used. The CISC x86 architecture has only four debug registers. Thus at most four pages could contain breakpoints. The page addresses, the 20 upper bits of the linear addresses of the breakpoints, are stored in emulation memory. These breakpoint page addresses are updated by debug setup routine 200 in a conventional manner.

On a TLB miss, test 310 can check the CR bit, or another bit in the emulation memory. Test 330, which determines if an incoming page has a breakpoint, searches through the four breakpoint page addresses for a match. If no match is found, then the incoming page does not contain a breakpoint and may be freely loaded, step 320. If a match is found, then a breakpoint occurs on the incoming page. Another emulation memory location is consulted to determine how many breakpoints are on that page. This memory location can conveniently be another dimension in the debug or page address table. Step 350 is activated if more than one breakpoint lies on the page, while step 360 is activated when only one breakpoint is in the incoming page. Thus only one CR bit is needed, to indicate if any debug breakpoints are enabled.

While an embodiment with four debug breakpoints has been described, additional debug registers can easily be provided by those skilled in the art. While simply increasing the number of breakpoints in the debug emulation table is useful, providing an additional level of debugging has some particular unexpected advantages. Four debug breakpoints, as described, could be used by a user program operating on a lower privilege level. Four or eight more debug breakpoints could be simultaneously in use by a higher-privilege-level operating system or system-level debugger. This system-level debugger may be used to debug the user program which itself is using all four lower-level breakpoints.

The breakpoint may vary in size or width, as is conventionally known. Thus the breakpoint may be one byte to about four bytes in size. The invention allows the width of the breakpoint to be dramatically increased beyond what is supported in hardware. All breakpoints would trap to the debug processing routine which would check the breakpoint, which can be of any width. The breakpoint register on the CPU die would not be used, but any page containing or within a breakpoint would not be loaded into the TLB.

For example, the video graphics display memory, 64 Kbytes to 2 Megabytes in width, may be defined as one large breakpoint. Any accesses to the display region would encounter an emulated breakpoint. This is particularly useful for power management. When the wide breakpoint is encountered, the operating system is informed that the display has been updated or accessed. The display's backlight could then be turned on, restoring power to the display. Thus some surprising, unexpected results such as power management are possible with the invention. The emulated debug breakpoints are much more flexible and useful than the prior-art fixed debug registers.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method for emulating a processor having a plurality of breakpoint register, using a processor with a single breakpoint register for storing just one breakpoint address and a translation-lookaside buffer (TLB) having a plurality of page entries, the breakpoints being addresses which halt execution of a user program when accessed, the method comprising the steps of:

freely loading page entries into the TLB when no more than one breakpoint in the plurality of breakpoints is enabled;

when two or more breakpoints in the plurality of breakpoints are enabled:

signaling a page fault when a faulting page does not have a translation in the TLB;

determining if a breakpoint in the plurality of breakpoints falls within the faulting page when the page fault is signaled, the breakpoint falling within the faulting page hereinafter referred to as a first breakpoint;

loading a page entry into the TLB for the faulting page;

loading the first breakpoint into the breakpoint register on the processor when the faulting page contains the first breakpoint;

invalidating any page entries in the TLB other than the faulting page entry for pages containing a breakpoint in the plurality of breakpoints other than the first breakpoint; and halting execution of the user program when the user program accesses an address matching the breakpoint address in the breakpoint register on the processor, wherein only one breakpoint in the plurality of breakpoints has a page translation entry in the TLB, the only one breakpoint being loaded into the breakpoint register on the processor when the faulting page's entry is loaded into the TLB.

2. The method of claim 1 wherein the plurality of breakpoints are addresses of data operands, the method further comprising the step of:

comparing the breakpoint address in the breakpoint register on the processor to an address of a data operand being accessed by the user program and signaling a breakpoint and halting the user program when a match occurs.

3. The method of claim 1 wherein the plurality of breakpoints are addresses of instructions, the method further comprising the step of:

comparing the breakpoint address in the breakpoint register on the processor to an address of an instruction being fetched for the user program and signaling a breakpoint and halting the user program when a match occurs.

4. The method of claim 1 further comprising the steps of:

determining when more than one breakpoint in the plurality of breakpoints falls within the faulting page;

dividing the faulting page into partial pages when more than one breakpoint falls within the faulting page, each partial page containing no more than one breakpoint in the plurality of breakpoints; and loading bounds fields in the TLB when loading the page entry for the faulting page when the faulting page contains more than one breakpoint, the bounds fields defining boundaries of the partial page within the faulting page, whereby pages may contain multiple breakpoints yet the multiple breakpoints share the single breakpoint register on the processor.

5. The method of claim 4 wherein the step of determining when more than one breakpoint in the plurality of breakpoints falls within the faulting page comprises the steps of:

reading a multiple-breakpoint bit in a condition register on the processor, the multiple-breakpoint bit being set when a second breakpoint is enabled in the plurality of breakpoints and the second breakpoint falls within a page which already contains another enabled breakpoint in the plurality of breakpoints; and comparing for a match an address of the faulting page to an address of the page containing the second breakpoint and indicating that more than one breakpoint falls within the faulting page when a match occurs and the multiple-breakpoint bit in the condition register is set.

6. The method of claim 5 wherein the step of comparing for a match signals a match when an upper portion of the address of the faulting page matches a page address for the address of the page containing the second breakpoint.

7. A system for emulating a processor having a plurality of breakpoint registers, wherein breakpoints are addresses which halt execution of a user program when accessed, the system comprising:

a central processing unit (CPU) comprising:

a breakpoint register for storing a single breakpoint address which halts execution of a user program when encountered;

address compare means, receiving a linear address generated by execution of the user program and coupled to the breakpoint register, for comparing the linear address to the breakpoint address and signaling a breakpoint fault when an address match occurs;

a translation-lookaside buffer (TLB), receiving the linear address, the TLB comprising a plurality of page translation entries for pages in memory having a fixed number of offset addresses, each page translation entry comprising a linear address field and a physical address field, the TLB outputting the physical address field for a matching entry when a portion of the linear address matches the linear address field in the matching entry;

a memory having a plurality of storage locations addressable by a plurality of physical addresses, the memory having:

a first portion for storing a debug table comprising a plurality of debug entries each for storing a breakpoint address; and a second portion for storing an emulation handler routine, the emulation handler routine including:

means for copying a breakpoint address from one of the debug entries in the debug table to the breakpoint register on the CPU;

invalidation means for invalidating a translation entry in the TLB containing a breakpoint address stored in the debug table but not stored in the breakpoint register on the CPU;

wherein only one breakpoint from the debug table in memory has a page translation entry in the TLB, the only one breakpoint being loaded into the breakpoint register on the processor by the emulation handler routine.

8. The system of claim 7 wherein the CPU further comprises:

a bound field in the matching entry in the TLB, the bound field containing a bound for a partial page;

bounds checking means, receiving the bound from the matching entry of the TLB, for comparing a portion of the linear address to the bound, signaling a page fault if the linear address is outside the bound for the partial page.

9. The system of claim 8 wherein the emulation handler routine further comprises:

partial page loading means for loading the bound field of the matching entry when the page translation entry is for a page containing multiple breakpoints, the page being divided into partial pages each containing one breakpoint.

10. The system of claim 7 wherein the breakpoint register stores a single breakpoint address for a data operand and wherein the plurality of breakpoints are breakpoints for data operands.

11. The system of claim 10 wherein the breakpoint register is a RISC data breakpoint register and wherein the plurality of breakpoints are four CISC breakpoints.

12. The system of claim 10 wherein the breakpoint register is a RISC data breakpoint register and wherein the plurality of breakpoints are eight CISC breakpoints arranged in two privilege levels.

13. The system of claim 7 wherein the breakpoint register stores a single breakpoint address for an instruction and wherein the plurality of breakpoints are breakpoints for instructions.

14. The system of claim 13 wherein the breakpoint register is a RISC instruction breakpoint register and wherein the plurality of breakpoints are four CISC breakpoints.

15. The system of claim 14 wherein the CPU further comprises:

a data breakpoint register for storing a single data breakpoint address which halts execution of a user program when a data operand stored at the single data breakpoint address is accessed;

second address compare means, receiving the linear address generated by execution of the user program and coupled to the data breakpoint register, for comparing the linear address to the single data breakpoint address and signaling a data breakpoint fault when an address match occurs;

whereby instruction breakpoints are stored in the breakpoint register but data operand breakpoints are stored in the data breakpoint register.

16. The system of claim 15 wherein the plurality of breakpoints include data operand breakpoints and instruction breakpoints, and wherein the debug table includes data and instruction breakpoints.

17. The system of claim 7 wherein the first portion of the memory further comprises a valid table for storing valid bits indicting which debug entries in the debug table are enabled.

18. A method for emulating a processor having a plurality of breakpoint registers, using a processor with no breakpoint register and a translation-lookaside buffer (TLB) having a plurality of page entries, the breakpoints being addresses which halt execution of a user program when accessed, the method comprising the steps of:

freely loading page entries into the TLB when no breakpoint in the plurality of breakpoints is enabled;

when one or more breakpoints in the plurality of breakpoints are enabled:

signaling a page fault when a faulting page does not have a translation in the TLB;

determining if a breakpoint in the plurality of breakpoints falls within the faulting page when the page fault is signaled, the breakpoint falling within the faulting page hereinafter referred to as a first breakpoint;

loading a page entry into the TLB for the faulting page when the faulting page contains no breakpoint;

not loading a page entry into the TLB but emulating a memory access for the faulting page when the faulting page contains the first breakpoint; and halting execution of the user program when the user program accesses an address matching the breakpoint address, wherein no breakpoint in the plurality of breakpoints has a page translation entry in the TLB.

* * * * *